(12) United States Patent
Lessard et al.

(10) Patent No.: US 9,272,854 B2
(45) Date of Patent: Mar. 1, 2016

(54) VEHICLE RESTRAINTS WITH ACTIVATED CATCHES

(71) Applicant: RITE-HITE HOLDING CORPORATION, Milwaukee, WI (US)

(72) Inventors: Kurt Lessard, South Milwaukee, WI (US); Timothy Cotton, Milwaukee, WI (US); Andrew Brooks, Thiensville, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 39 days.

(21) Appl. No.: 14/174,583

(22) Filed: Feb. 6, 2014

(65) Prior Publication Data

US 2015/0217951 A1    Aug. 6, 2015

(51) Int. Cl.
*B65G 69/34* (2006.01)
*B65G 69/28* (2006.01)
*B65G 69/00* (2006.01)

(52) U.S. Cl.
CPC .............. *B65G 69/28* (2013.01); *B65G 69/003* (2013.01); *B65G 2207/40* (2013.01)

(58) Field of Classification Search
CPC .................................................... B65G 69/003
USPC ........................................................ 414/401
See application file for complete search history.

(56) References Cited

U.S. PATENT DOCUMENTS 2,722,449 A    11/1955   Harley
4,208,161 A    6/1980    Hipp et al.

(Continued)

FOREIGN PATENT DOCUMENTS

CA    2140743    6/1999
CN    1926034    3/2007

(Continued)

OTHER PUBLICATIONS

Rite-Hite Holding Corporation, "G3 Posi-Lok," 4 sheets drawings/text, Drawing # 1262; Drawing # 56158; dated Sep. 26, 1989.

(Continued)

*Primary Examiner* — Kaitlin Joerger
(74) *Attorney, Agent, or Firm* — Hanley, Flight & Zimmerman, LLC

(57) ABSTRACT

Vehicle restraints with activated catches are disclosed. An example vehicle restraint includes a main body mountable at a loading dock and to move vertically relative to the loading dock. A barrier is movable relative to the main body to selectively block and release a RIG of a vehicle, where the barrier is selectively movable to a first blocking position to block the RIG, a stored position to release the RIG, and an intermediate position between the first blocking position and the stored position. A pawl is movable relative to the barrier between an activated position and a released position. A stop is carried by the main body and a pawl actuator is coupled to at least one of the main body and the barrier. The pawl actuator has a contact surface to engage the RIG, where the contact surface is movable between a raised position and a lowered position relative to the barrier. The contact surface moves between the raised position and the lowered position in response to relative movement between the RIG and the barrier while the contact surface is in engagement with the RIG. Movement of the contact surface from the raised position to the lowered position is to cause the pawl to move from the released position to the activated position. The pawl is spaced apart from the stop when the barrier is at the intermediate position while the pawl is in the released position and the pawl to engage the stop when the barrier is at the intermediate position while the pawl is in the activated position.

26 Claims, 25 Drawing Sheets

(56) References Cited

U.S. PATENT DOCUMENTS

| | | | |
|---|---|---|---|
| 4,267,748 A | 5/1981 | Grunewald et al. | |
| 4,282,621 A | 8/1981 | Anthony et al. | |
| 4,373,847 A | 2/1983 | Hipp et al. | |
| 4,379,354 A | 4/1983 | Hahn et al. | |
| 4,472,099 A | 9/1984 | Hahn et al. | |
| 4,560,315 A | 12/1985 | Hahn | |
| 4,605,353 A | 8/1986 | Hahn et al. | |
| 4,648,781 A | 3/1987 | Sikora | |
| 4,674,941 A | 6/1987 | Hageman | |
| 4,759,678 A * | 7/1988 | Hageman | 414/401 |
| 4,843,373 A | 6/1989 | Trickle et al. | |
| 4,861,217 A | 8/1989 | Erlandsson | |
| 4,887,954 A * | 12/1989 | Gregerson et al. | 414/401 |
| RE33,242 E | 6/1990 | Hipp et al. | |
| 4,988,254 A | 1/1991 | Alexander | |
| 5,026,242 A | 6/1991 | Alexander | |
| 5,071,306 A | 12/1991 | Alexander | |
| 5,096,359 A | 3/1992 | Alexander | |
| 5,120,181 A * | 6/1992 | Alexander | 414/401 |
| 5,203,663 A | 4/1993 | Ruppe | |
| 5,297,921 A | 3/1994 | Springer et al. | |
| 5,340,181 A | 8/1994 | Matsuyama | |
| 5,348,437 A | 9/1994 | Krupke et al. | |
| 5,505,575 A | 4/1996 | Alexander | |
| 5,882,167 A * | 3/1999 | Hahn | B65G 9/003 414/396 |
| 6,139,242 A | 10/2000 | Alexander | |
| 6,162,005 A | 12/2000 | Fritz | |
| 6,431,819 B1 | 8/2002 | Hahn | |
| 7,841,823 B2 | 11/2010 | Sveum et al. | |
| 8,616,826 B2 * | 12/2013 | Cotton et al. | 414/809 |
| 9,145,273 B2 | 9/2015 | Brooks et al. | |
| 9,150,367 B2 | 10/2015 | Brooks et al. | |
| 9,174,811 B2 | 11/2015 | Proffitt et al. | |
| 2004/0042882 A1 | 3/2004 | Breen | |
| 2005/0169732 A1 | 8/2005 | Sveum et al. | |
| 2006/0045678 A1 | 3/2006 | Andersen | |
| 2008/0095598 A1 | 4/2008 | Cotton et al. | |
| 2010/0266375 A1 | 10/2010 | Ion | |
| 2011/0158778 A1 | 6/2011 | Harrington | |
| 2011/0243694 A1 | 10/2011 | Andersen et al. | |
| 2012/0087772 A1 | 4/2012 | Cotton et al. | |
| 2013/0017044 A1 | 1/2013 | Brooks et al. | |
| 2013/0017045 A1* | 1/2013 | Brooks et al. | 414/401 |
| 2014/0064891 A1 | 3/2014 | Brooks | |
| 2014/0064892 A1 | 3/2014 | Proffitt et al. | |
| 2015/0210487 A1 | 7/2015 | Brooks et al. | |

FOREIGN PATENT DOCUMENTS

| | | |
|---|---|---|
| WO | 2013009960 | 1/2013 |
| WO | 2014035727 | 3/2014 |

OTHER PUBLICATIONS

United States Patent and Trademark Office, "Non-Final Office Action," issued in connection with U.S. Appl. No. 13/182,049, mailed on Apr. 4, 2012, 14 pages.

International Bureau, "International Search Report," issued in connection with International patent application No. PCT/US2012/046416, mailed on Sep. 28, 2012, 5 pages.

International Bureau, "Written Opinion of the International Searching Authority," issued in connection with International patent application No. PCT/US2012/046416, mailed on Sep. 28, 2012, 7 pages.

United States Patent and Trademark Office, "Final Office Action," issued in connection with U.S. Appl. No. 13/182,049, mailed on Oct. 25, 2012, 10 pages.

United States Patent and Trademark Office, "Non-Final Office Action," issued in connection with U.S. Appl. No. 13/233,884, mailed on Nov. 19, 2012, 21 pages.

United States Patent and Trademark Office, "Final Office Action," issued in connection with U.S. Appl. No. 13/233,884, mailed on Mar. 15, 2013, 13 pages.

United States Patent and Trademark Office, "Non-Final Office Action," issued in connection with U.S. Appl. No. 13/182,049, mailed on Apr. 11, 2013, 18 pages.

United States Patent and Trademark Office, "Advisory Action," issued in connection with U.S. Appl. No. 13/233,884, mailed on Jul. 19, 2013, 8 pages.

United States Patent and Trademark Office, "Notice of Allowance and Fee(s) Due," issued in connection with U.S. Appl. No. 13/182,049, mailed on Oct. 17, 2013, 18 pages.

International Bureau, "International Preliminary Report on Patentability," issued in connection with International patent application No. PCT/US2012/046416, mailed on Jan. 23, 2014, 8 pages.

United States Patent and Trademark Office, "Notice of Allowance," issued in connection with U.S. Appl. No. 13/182,049, mailed on Jun. 23, 2014, 5 pages.

United States Patent and Trademark Office, "Restriction Requirement," issued in connection with U.S. Appl. No. 13/233,884, mailed on Jun. 19, 2014, 7 pages.

Canadian Intellectual Property Office, "Office Action", issued in connection with Canadian Patent Application No. 2,825,536, dated Mar. 31, 2015, 3 pages.

European Patent Office, "Extended European Search Report," issued in connection with European Patent Application No. 15000161.8, on Jun. 15, 2015, 11 pages.

European Patent Office, "Extended European Search Report," issued in connection with European Patent Application No. 15000162.6, on Jun. 15, 2015, 11 pages.

The United States Patent and Trademark Office, "Non-Final Office Action," issued in connection with U.S. Appl. No. 13/599,770, on Jun. 25, 2015, 48 pages.

The United States Patent and Trademark Office, "Notice of Allowance," issued in connection with U.S. Appl. No. 13/604,315, on Jun. 30, 2015, 33 pages.

International Searching Authority, "International Search Report," issued in connection with International Application No. PCT/US2013/055808, on Nov. 8, 2013 4 pages.

International Searching Authority, "Written Opinion," Issued in connection with International Application No. PCT/US2013/055808, on Nov. 8, 2013, 7 pages.

State Intellectual Property Office of the People's Republic of China, "First Office Action," issued in connection with Chinese application serial No. 201280034260.X, issued Jan. 12, 2015, 18 pages.

International Bureau, "International Preliminary Report on Patentability," issued in connection with International Patent Application No. PCT/US2013/055808, issued on Mar. 3, 2015, 8 pages.

IP Australia, "Patent Examination Report No. 1," issued in connection with Australian Patent Application No. 2012281071, dated Mar. 23, 2015, 3 pages.

United States Patent and Trademark Office, "Notice of Allowance," issued in connection with U.S. Appl. No. 13/182,049, mailed Jan. 20, 2015, 28 pages.

United States Patent and Trademark Office, "Non-Final Office Action," issued in connection with U.S. Appl. No. 13/233,884, mailed Nov. 19, 2014, 30 pages.

United States Patent and Trademark Office, "Non-Final Office Action," issued in connection with U.S. Appl. No. 13/604,315, mailed Feb. 5, 2015, 17 pages.

United States Patent and Trademark Office, "Notice of Allowance", issued in connection with U.S. Appl. No. 13/233,884, dated Apr. 10, 2015 (22 pages).

United States Patent and Trademark Office, "Supplemental Notice of Allowability," issued in connection U.S. Appl. No. 13/604,315, Jul. 15, 2015, 2 pages.

United States Patent and Trademark Office, "Second Supplemental Notice of Allowability," issued in connection U.S. Appl. No. 13/604,315, Aug. 18, 2015, 2 pages.

United States Patent and Trademark Office, "Third Supplemental Notice of Allowability," issued in connection U.S. Appl. No. 13/604,315, Aug. 21, 2015, 2 pages.

IP Australia, "Patent Examination Report No. 1 ," issued in connection with Australian Patent Application No. 2015200158, Aug. 26, 2015, 5 pages.

(56) References Cited

OTHER PUBLICATIONS

State Intellectual Property Office of the People's Republic of China, "Second Office Action, issued in connection with Chinese application serial No. 201280034260.X, issued Aug. 5, 2015, 16 pages."

IP Australia, "Patent Examination Report No. 2," issued in connection with Application No. 2012281071, Sep. 9, 2015, 3 pages.

Canadian Intellectual Property Office, "Office Action", issued in connection with Canadian Patent Application No. 2,840,237, dated Mar. 12, 2015 (3 pages).

European Patent Office, "Communication pursuant to Rule 69 EPC," issued in connection with European Patent Application No. 15000161.8, Aug. 10, 2015, 2 pages.

United States Patent and Trademark Office, "Notice of Allowance," issued in connection with U.S. Appl. No. 13/599,770, Sep. 29, 2015, 50 pages.

IP Australia, "Patent Examination Report No. 1," issued in connection with Application No. 2015200174, Sep. 14, 2015, 3 pages.

European Patent Office, "Communication pursuant to Rule 69 EPC," issued in connection with European Patent Application No. 15000162.6, Aug. 17, 2015, 2 pages.

Mexican Patent Office, "Office Action," issued in connection with Application No. MX/a/2014/000282, Oct. 26, 2015, 2 pages.

Non-certified English language summary of "Office Action" issued by the Mexican Patent Office in connection with Application No. MX/a/2014/000282, Nov. 5, 2015, 1 page, Redacted.

IP Australia, "Notice of Acceptance," issued in connection with Application No. 2012281071, Nov. 6, 2015, 2 pages.

IP Australia, "Patent Examination Report No. 2," issued in connection with Application No. 2015200174, Dec. 4, 2015, 3 pages.

\* cited by examiner

VEHICLE RESTRAINTS WITH ACTIVATED CATCHES

FIELD OF THE DISCLOSURE

This patent relates generally to vehicle restraints and, more specifically, to vehicle restraints with activated catches.

BACKGROUND

When loading or unloading a truck parked at a loading dock, it is generally a safe practice to help restrain the truck from accidentally moving too far away from the dock. This is often accomplished by a hook-style vehicle restraint that engages what is often referred to in the industry as a truck's ICC bar (Interstate Commerce Commission bar) or RIG (Rear Impact Guard). An ICC bar or RIG comprises a bar or beam that extends horizontally across the rear of a truck, below the truck bed. Its primary purpose is to help prevent an automobile from under-riding the truck in a rear-end collision. A RIG, however, also provides a convenient structure for a hook-style restraint to reach up in front of the bar to obstruct the bar's movement away from the dock. To release the truck and prepare for the next one to enter, many restraints descend below the bar to a preparatory position.

Although the horizontal bar of a RIG is fairly standardized, the bar's supporting structure can vary significantly. In some cases, the supporting structure can interfere with the operation of the restraint. Some supporting structures can make it difficult for a vehicle restraint to sense the location of the bar and determine whether the bar is properly restrained.

DETAILED DESCRIPTION

Figure 1:
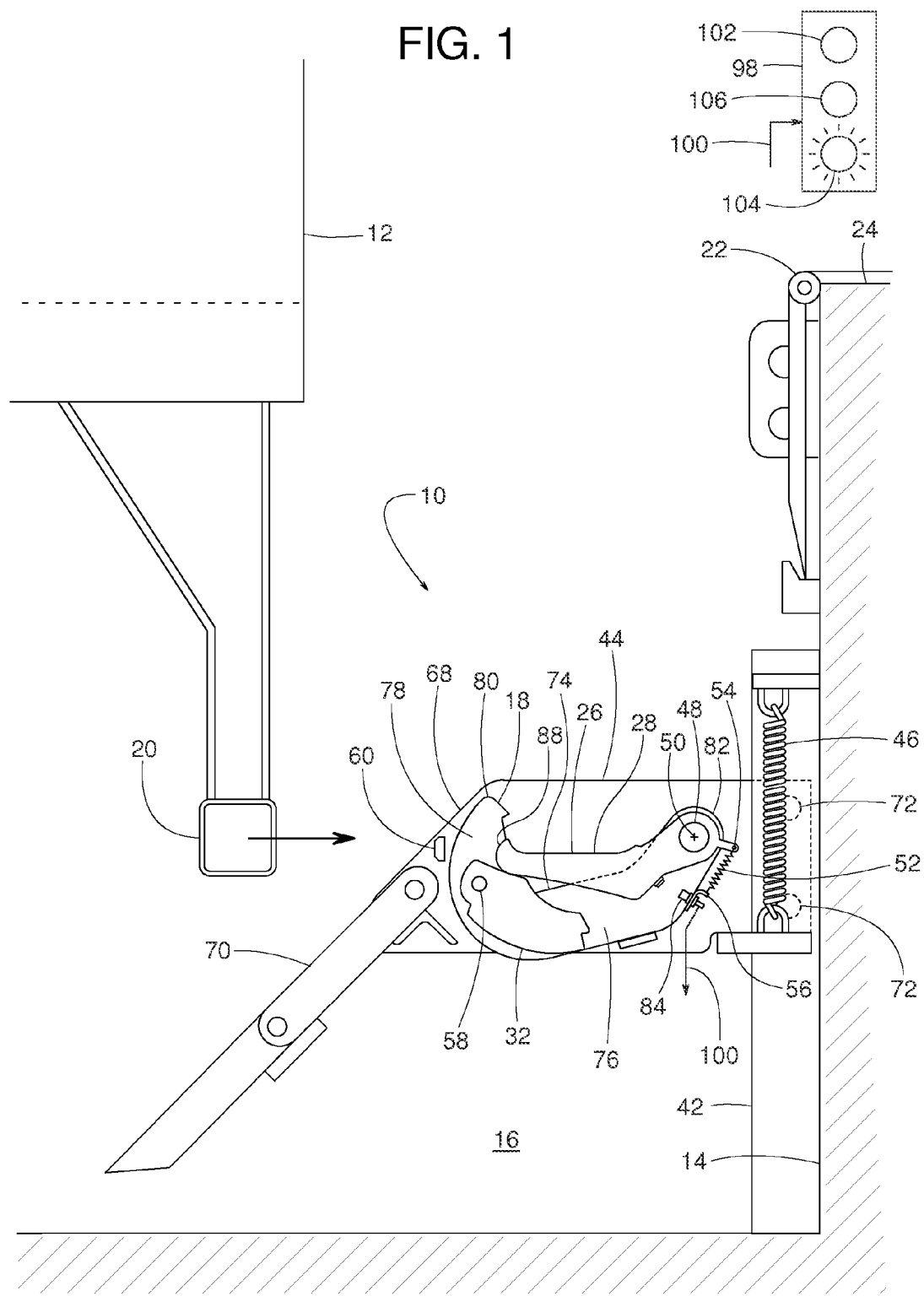
FIG. 1 is a side view of an example vehicle restraint constructed in accordance with the teachings disclosed herein, where some parts of the example vehicle restraint of FIG. 1 are omitted to show the inner workings of the example restraint more clearly.

Some example vehicle restraints disclosed herein include a barrier to block a RIG (Rear Impact Guard) of a vehicle positioned near or adjacent a dock face of a loading dock. Some example vehicle restraints disclosed herein include a pawl to selectively engage a stop positioned on the vehicle restraint to limit the extent to which the barrier can withdraw from a blocking position (e.g., a position in which the vehicle restraint engages the RIG). In some examples, a pawl of an example vehicle restraint moves between an activated position and a released position in response to a pawl actuator engaging a downward facing surface of the RIG. In some examples, a pawl actuator of the vehicle restraint provides multiple different functions such as, but not limited to, sensing a position of a downward facing surface of the RIG relative to a barrier of the vehicle restraint, triggering the operation of a reversible drive motor that moves the barrier, and activating the pawl to limit or restrict the extent to which the barrier can retract under certain operating conditions.

FIGS. 1-10 show an example vehicle restraint 10 that helps prevent a vehicle 12 (e.g., truck, trailer, etc.) from accidentally moving too far forward away from a dock face 14 of a loading dock 16 while cargo is being added or removed from the vehicle 12. To limit such forward movement, the example restraint 10 includes a barrier 18 for capturing or restraining a RIG 20 (Rear Impact Guard) of the vehicle 12, also known as an ICC bar (Interstate Commerce Commission bar). When the vehicle 12 is safely restrained, a dock leveler 22 can be deployed to provide a bridge across which forklifts and other material handling equipment can travel to transfer cargo between the vehicle 12 and an elevated platform 24 of the dock 16. The term, "RIG" encompasses the horizontal impact bar plus the framework or structure that connects the bar to the rest of the vehicle 12.

Figure 4:
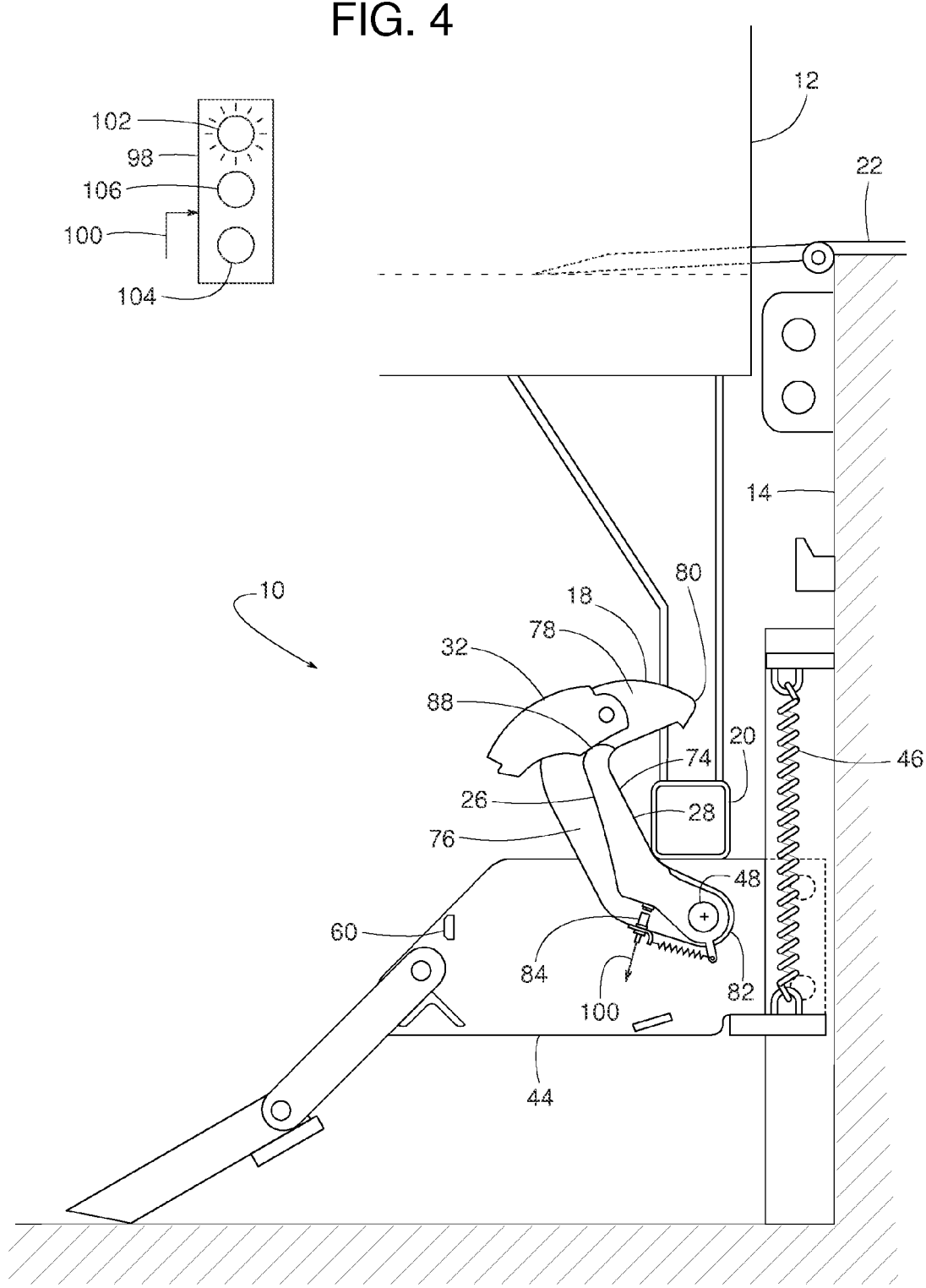
FIG. 4 is a side view similar to FIG. 3 but showing a pawl actuator of the example restraint at a lowered position relative to the barrier.
Figure 9:
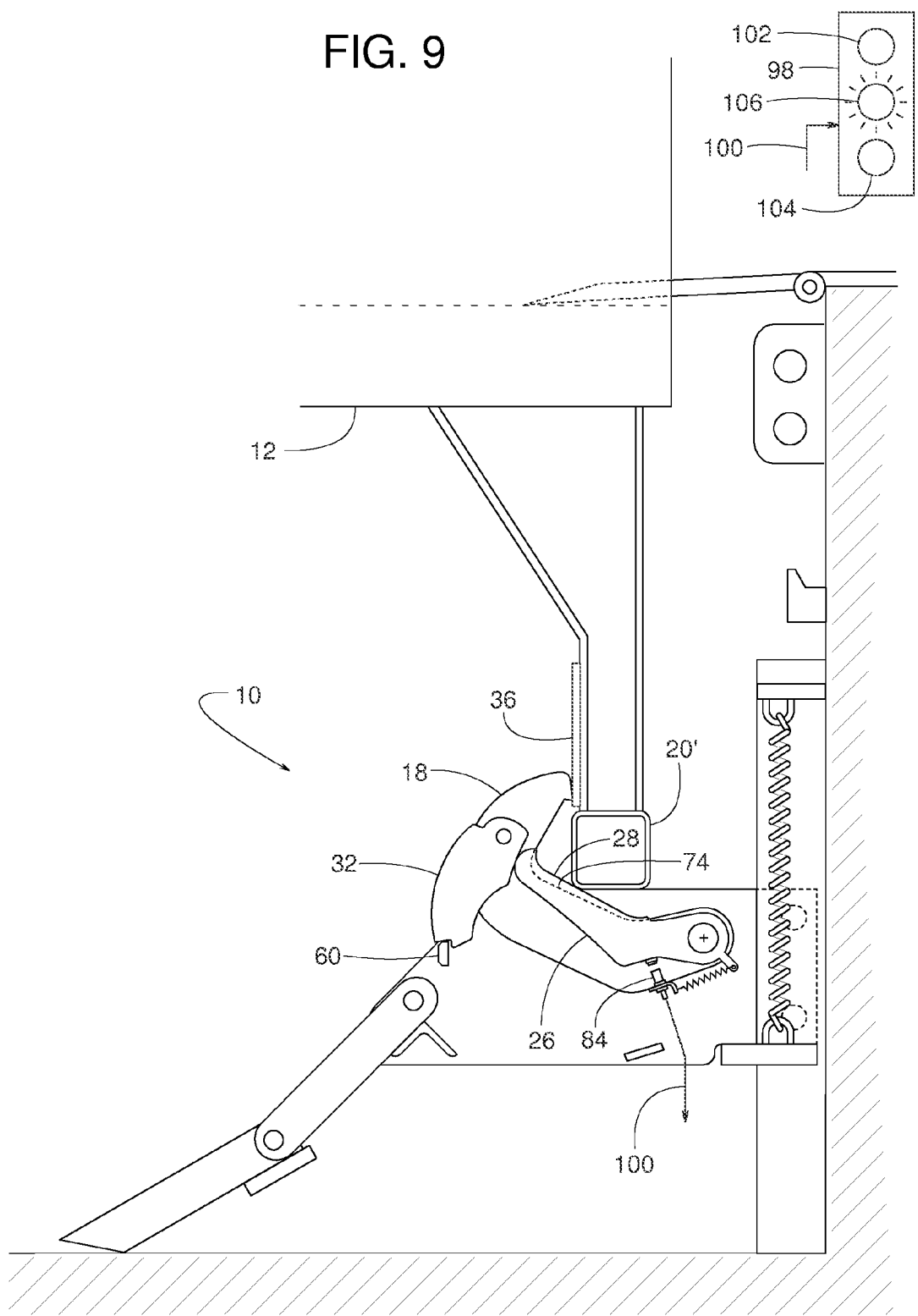
FIG. 9 is a side view similar to FIG. 5 but showing the example restraint blocking a vehicle with an alternate RIG design.
Figure 10:
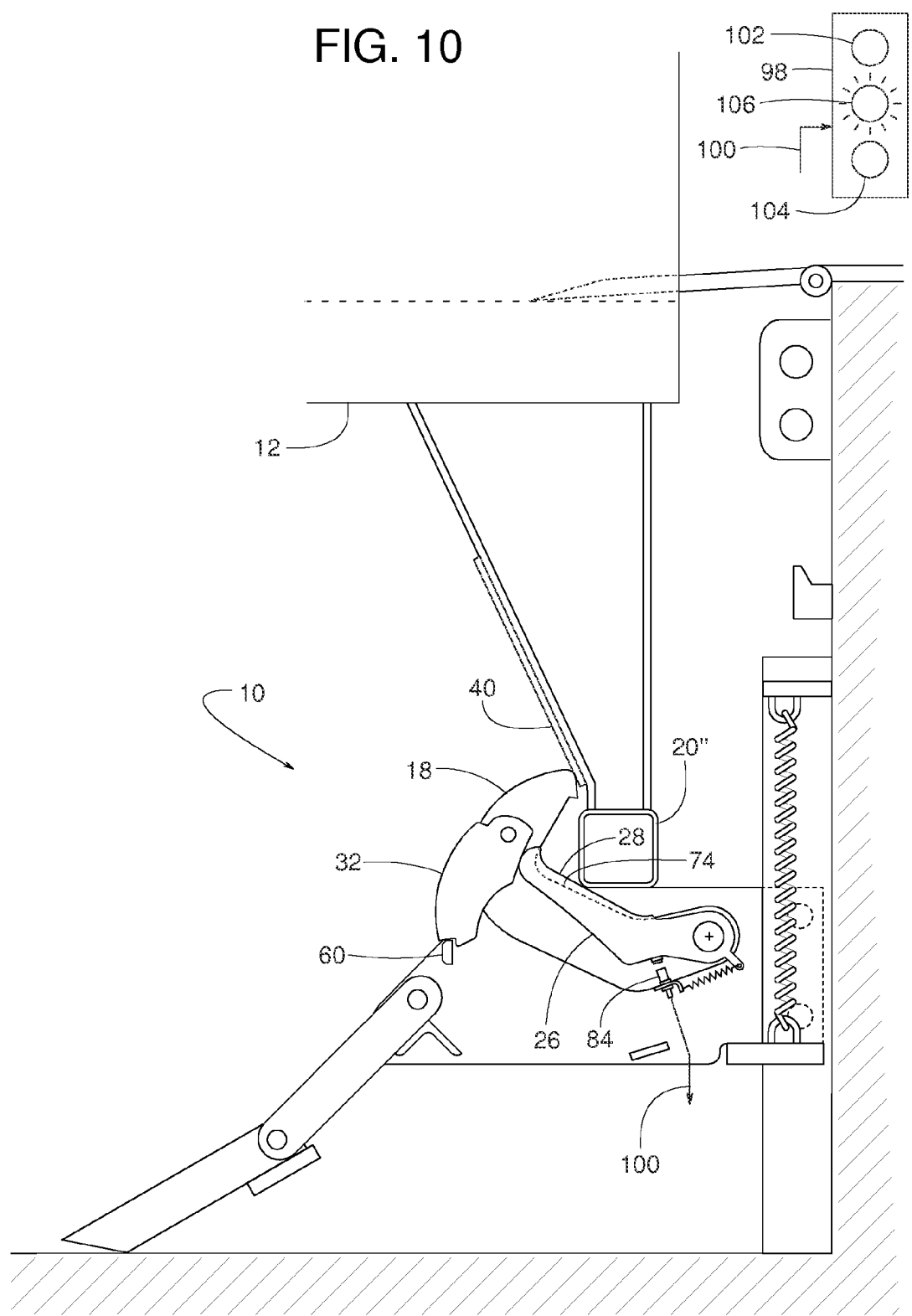
FIG. 10 is a side view similar to FIG. 5 but showing the example restraint blocking a vehicle with another alternate RIG design.

To ensure positive engagement between the barrier 18 and the RIG 20, the vehicle restraint 10 of FIG. 1 has a pawl actuator 26 that includes a RIG-engaging contact surface 28. In this example, the pawl actuator 26 provides several functions such as, but not limited to, sensing the presence of the RIG 20 relative to the barrier 18, triggering an operation of a reversible drive motor 30 (FIG. 6) that moves the barrier 18, and activating a pawl 32 to limit the extent to which barrier 18 can retract under certain operating conditions. The pawl actuator 26 and the pawl 32 enable the example vehicle restraint 10 to restrain vehicles having various RIG designs or configurations such as, for example, the RIG 20 where the barrier 18 can extend up and over a top of the RIG 20 as shown in FIG. 4, RIG 20' where an upper end of the barrier 18 is obstructed by a vertical plate 36 on the RIG's supporting structure as shown in FIG. 9, and the RIG 20" where the upper end of the barrier 18 is obstructed by an inclined plate 40 on the RIG's supporting structure as shown in FIG. 10.

In the illustrated example of FIGS. 1-10, the example vehicle restraint 10 includes a track 42 attached to the dock face 14, a main body 44 mounted for vertical travel along track 42, and one or more springs 46 that urge the main body 44 upward toward the platform 24. A shaft 48 pivotally couples the barrier 18 to the main body 44 such that the barrier 18 can rotate about an axis 50 relative to the main body 44. In the illustrated example, the vehicle restraint 10 also includes the pawl actuator 26 coupled to the barrier 18 and the main body 44 by way of a shaft 48 such that the pawl actuator 26 can rotate about the axis 50 relative to the barrier 18 and the main body 44. A tension spring 52 extends between a point 54 fixed with reference to the pawl actuator 26 and a point 56 fixed with reference to the barrier 18 such that the tension spring 52 urges the pawl actuator 26 to rotate relative to the barrier 18 to a released position or a position shown in FIG. 1. A pin 58 pivotally couples the pawl 32 to the barrier 18 such that the pawl 32 pivots or rotates relative to the barrier 18 about an axis defined by the pin 58. A pawl stop 60 is affixed to or carried by the main body 44. To more clearly illustrate the inner workings of the example vehicle restraint 10, a side plate 44a and a barrier plate 18a (shown in FIG. 6) have been omitted in FIGS. 1-5 and 7-10.

Some example operations of the vehicle restraint 10 follow the sequence of FIGS. 1, 2, 3, 4, 5, 7 and 8. FIG. 1 shows the vehicle 12 backing into the dock 16 and approaching the vehicle restraint 10. At this point in the operation, as shown in the illustrated example of FIG. 1, the spring 46 holds the main body 44 at a raised preparatory position to receive the RIG 20. In some examples, to allow the vehicle 12 to move the RIG 20 back over the top of barrier 18, a drive motor 30 (e.g., a hydraulic motor, an electric motor, a hydraulic cylinder, etc., as shown in FIG. 6) retracts the barrier 18 to a stored position relative to the main body 44. In this example, a drive train 62 couples an output shaft 64 of the motor 30 to the shaft 48, and the shaft 48 is keyed or otherwise affixed to the barrier 18 so that the shaft 48 and the barrier 18 rotate as a unit. Thus, the drive motor 30, which can rotate in either direction, is able to rotate the barrier 18 between the stored position (FIGS. 1 and 2) and a first blocking position (e.g., FIG. 4). The spring 52 maintains the contact surface 28 of the pawl actuator 26 at a raised position relative to the barrier 18, and a torsion spring 66 disposed around a pin 58 (FIG. 6) rotates the pawl 32 to a released position (FIGS. 1-3) relative to the barrier 18 with the pawl 32 being spaced apart or disengaged from stop 60.

Figure 2:
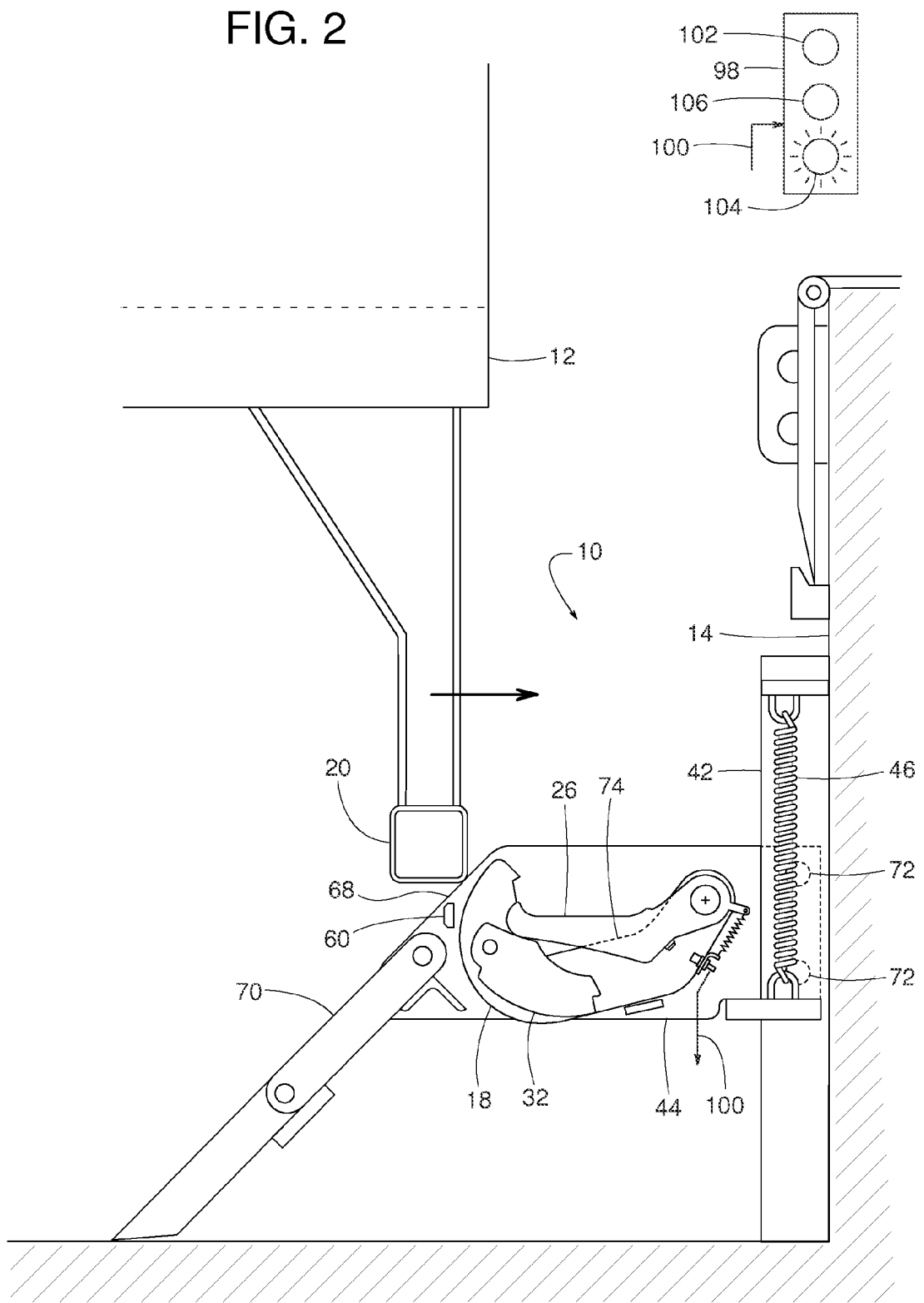
FIG. 2 is a side view of the example vehicle restraint of FIG. 1 but showing a vehicle pushing a main body of the example restraint downward.

Next, the illustrated example of FIG. 2 shows the vehicle 12 continuing to move back toward the dock face 14. Upon doing so, the RIG 20 forces or moves the main body 44 downward as the RIG 20 slides along a ramp portion 68 of the main body 44. In cases where the RIG 20 is exceptionally low, an articulated lead-in ramp extension 70 is used in some examples to guide the RIG 20 onto the ramp 68. In this example, a set of rollers 72 on the main body 44 and extending into the track 42 reduces (e.g., minimizes) friction as the main body 44 travels vertically along the track 42. As the RIG 20 pushes the main body 44 down, as shown in the illustrated example of FIG. 2, the barrier 18 remains in the stored position, the pawl 32 is in a released position, and the pawl actuator 26 is in an exposed raised position.

Figure 3:
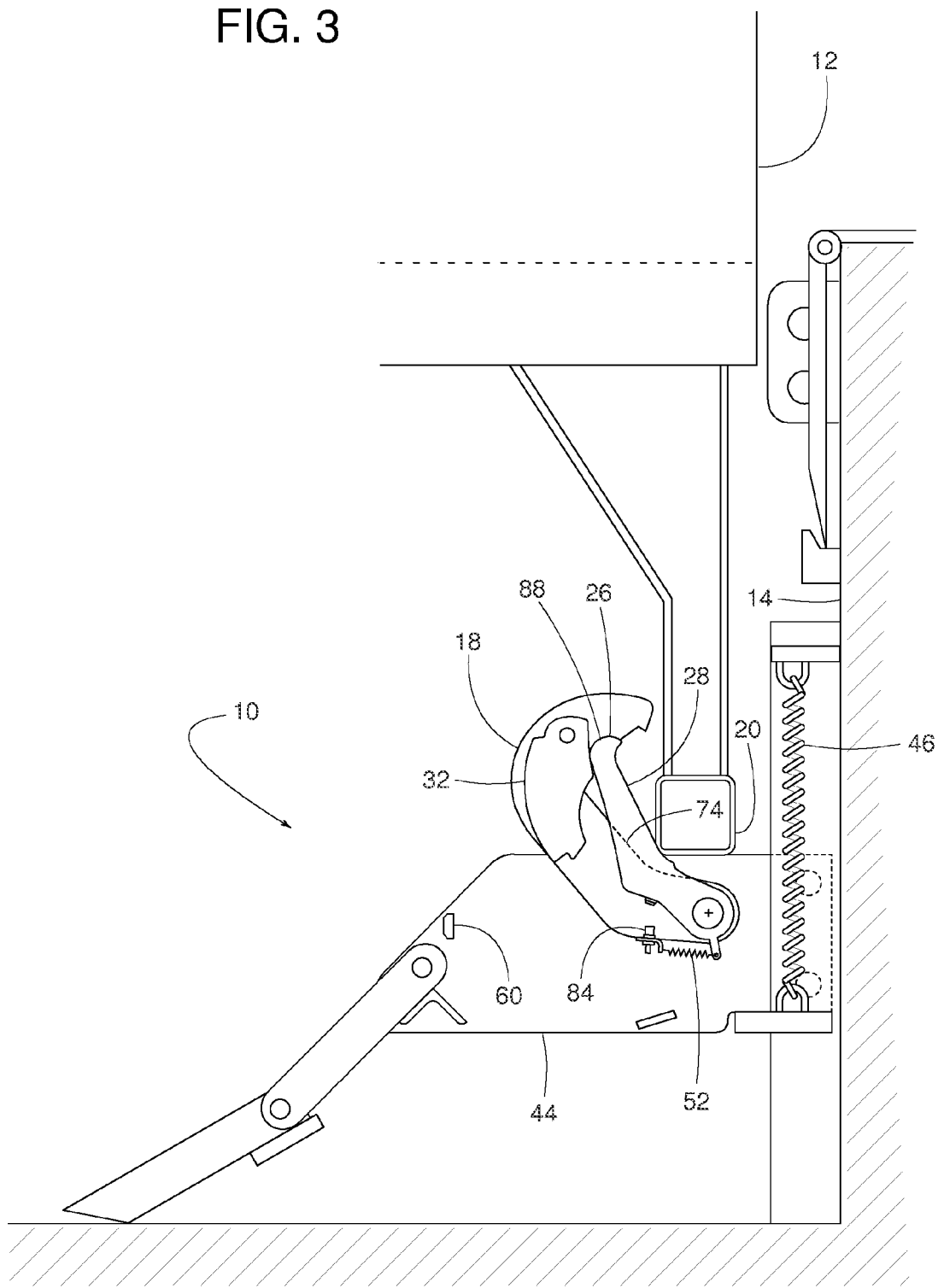
FIG. 3 is a side view of the example vehicle restraint of FIG. 1 but showing a barrier of the example restraint blocking a RIG of the vehicle.

In some examples, the RIG 20 pushes the main body 44 down to an operative position (FIGS. 3-10), and once the vehicle 12 moves the RIG 20 sufficiently close to the dock face 14, the drive motor 30 is activated to lift or rotate the barrier 18 to the position shown in FIG. 3. Lifting or rotating the barrier 18 causes or moves the contact surface 28 of the pawl actuator 26 into initial contact with a lower edge (e.g., a bottom edge and/or a front edge) of the RIG 20, as shown in FIG. 3.

After initial contact between the contact surface 28 of the pawl actuator 26 and the RIG 20, the drive motor 30 continues rotating barrier 18 to a first blocking position, as shown in FIG. 4. Engagement between the contact surface 28 and the RIG 20 while the barrier 18 rotates from the position of FIG. 3 to the position of FIG. 4 forces the contact surface 28 downward to become generally flush with a throat surface 74 of the barrier 18. In this example, the barrier 18 is generally L-shaped with one leg of the L-shape (e.g., a straight or planar leg) being referred to as a throat 76 and another leg (e.g., a curved leg) being a riser 78. The barrier 18, in this example, extends between an upper end 80 of the riser 78 and an anchored end 82 of the throat 76 where the throat 76 connects or couples to the shaft 48. The throat surface 74 is a surface on the barrier 18 that is situated to engage a lower edge of the RIG 20. The contact surface 28 of the pawl actuator 26 moving "downward" or in a downwardly direction means a direction of movement of the contact surface 28 includes at least some descent toward earth, with the descent not necessarily being solely vertical.

Figure 5:
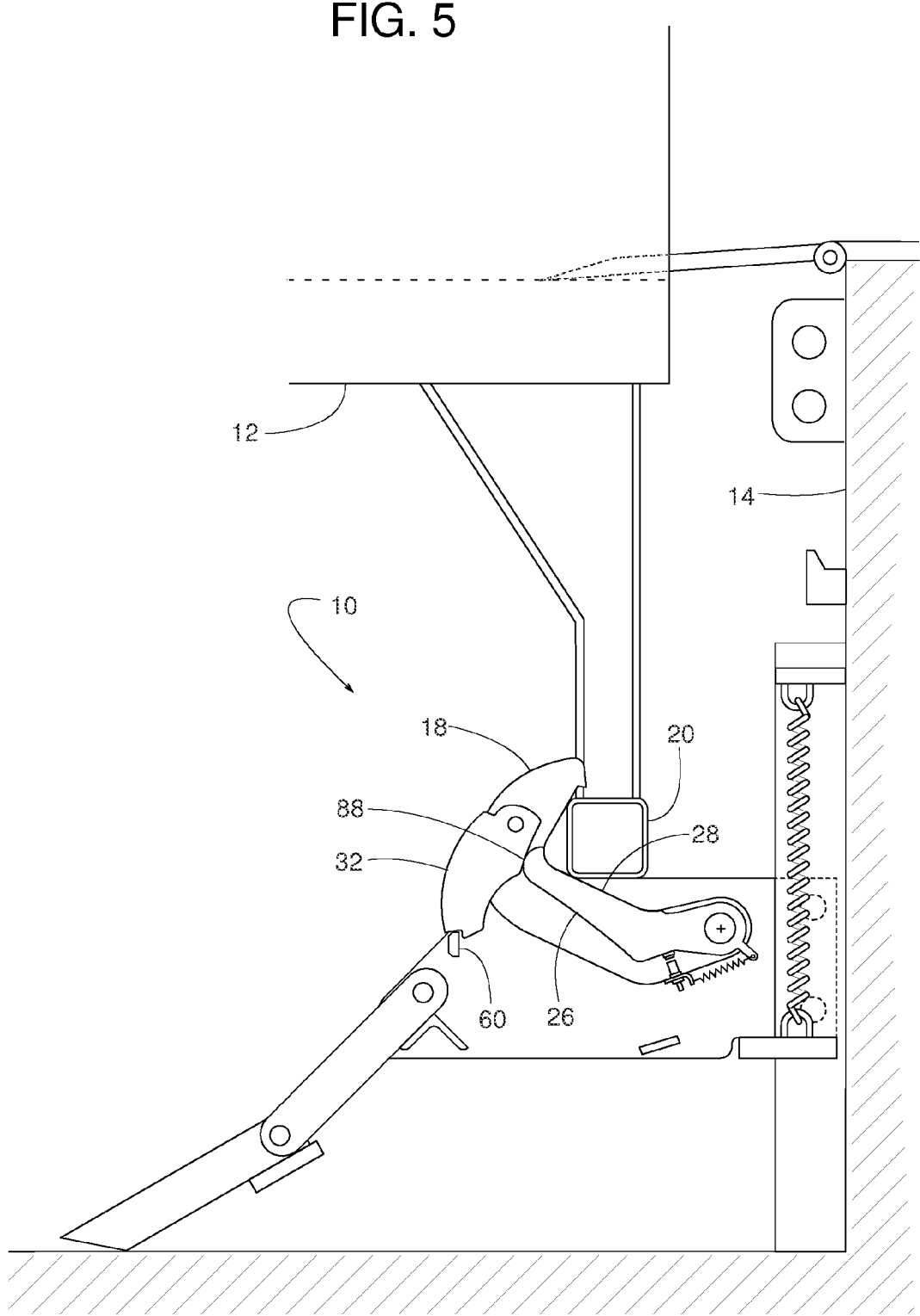
FIG. 5 is a side view similar to FIG. 4 but showing the RIG having moved the barrier of the example restraint to an intermediate position with a pawl of the example restraint engaging a stop.
Figure 6:
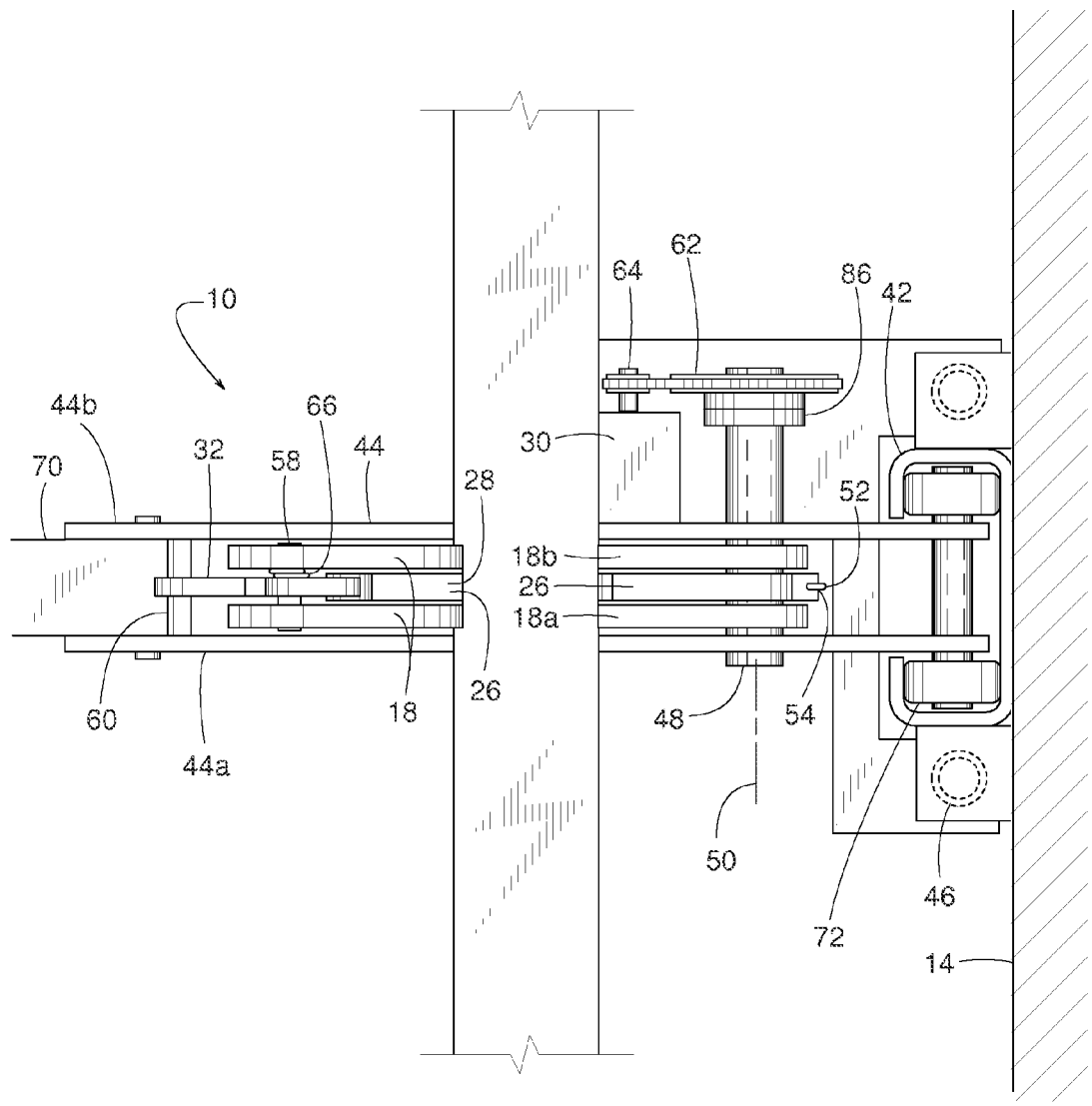
FIG. 6 is a top view of the example vehicle restraint of FIG. 1 shown in the position of FIG. 5 with the previously omitted parts now shown.

In the illustrated example, the pawl actuator 26 moving from the position of FIG. 3 to that of FIG. 4 moves the contact surface 28 from the raised position (FIGS. 1-3) to a lowered position (FIGS. 4 and 5). A sensor 84 (e.g., a proximity sensor, a limit switch, a photoelectric eye, a rotational switch, a resolver, an encoder, etc.) senses the relative position of the pawl actuator 26 and the barrier 18 and determines whether contact surface 28 is in the lowered position (e.g., FIGS. 4 and 5) relative to the barrier 18. The sensor 84 of the illustrated example determines that the contact surface 28 is in the lowered position to confirm that the RIG 20 is properly positioned against the throat surface 74 and securely restrained by the barrier 18 so the dock leveler 22 can be deployed to facilitate the transfer of cargo to and from the vehicle 12.

In some examples, as the weight of cargo and material handling equipment transfers across the dock leveler 22, a response of the vehicle's suspension might result in some vertical and horizontal movement of the RIG 20. In some such examples, the spring 46 allows the main body 44 to follow the vertical movement of the RIG 20, and a slip clutch 86 (FIG. 6) on drive train 62 allows the barrier 18 to follow a forward movement of the RIG 20 in a direction away from the dock face 14. In some examples, when the RIG 20 moves back toward the dock face 14, away from the barrier 18, the spring 52 moves the pawl actuator 26 from the lowered position (FIG. 4) to the raised position (FIG. 3). In some examples, the movement of the pawl actuator 26 causes or enables the sensor 84 to detect that the RIG 20 has moved away from the barrier's throat 76, and so in response to the sensor 84 detecting the movement of the pawl actuator 26, the drive motor 30 is activated (e.g., reactivated) to move the barrier 18 back up against the RIG 20 to the position shown in FIG. 4.

Although the slip clutch 86 permits some forward movement of the vehicle 12, the vehicle restraint 10 is designed to limit such forward movement. In some examples, as contact surface 28 moves to the lowered position of FIG. 4, a distal end 88 of the pawl actuator 26 pushes the pawl 32 from the released position (FIGS. 1-3) outward to an activated position (FIG. 4-10). The pawl 32 moving from the released position (FIG. 3) to the activated position (FIG. 4) occurs substantially simultaneously and in response to the pawl actuator 26 moving from the raised position (FIG. 3) to the lowered position (FIG. 4). In the illustrated example, the rotation of the pawl 32 and the pawl actuator 26 are in opposite (e.g., clockwise/counterclockwise) directions to create an effective holding force therebetween. The pawl 32 in the activated position limits the extent to which the barrier 18 can descend (e.g., downward and/or toward the stored position) because the pawl 32 in the activated position encounters or engages a catch 60 when the RIG 20 forces the barrier 18 back down to the intermediate position shown in FIG. 5. So, if the vehicle 12 pulls forward away from the dock face 14 with sufficient force that the RIG 20 overcomes the resistance of the drive motor 30 and/or the slip clutch 86 to forcibly push or move the barrier 18 from the first blocking position (FIG. 4) to the intermediate position (FIGS. 5 and 6), the pawl 32 engaging stop 60 firmly holds the barrier 18 at the intermediate position to restrict further rotation of the barrier 18 toward a stored position so that the barrier 18 can still provide an obstruction to the RIG 20.

Figure 7:
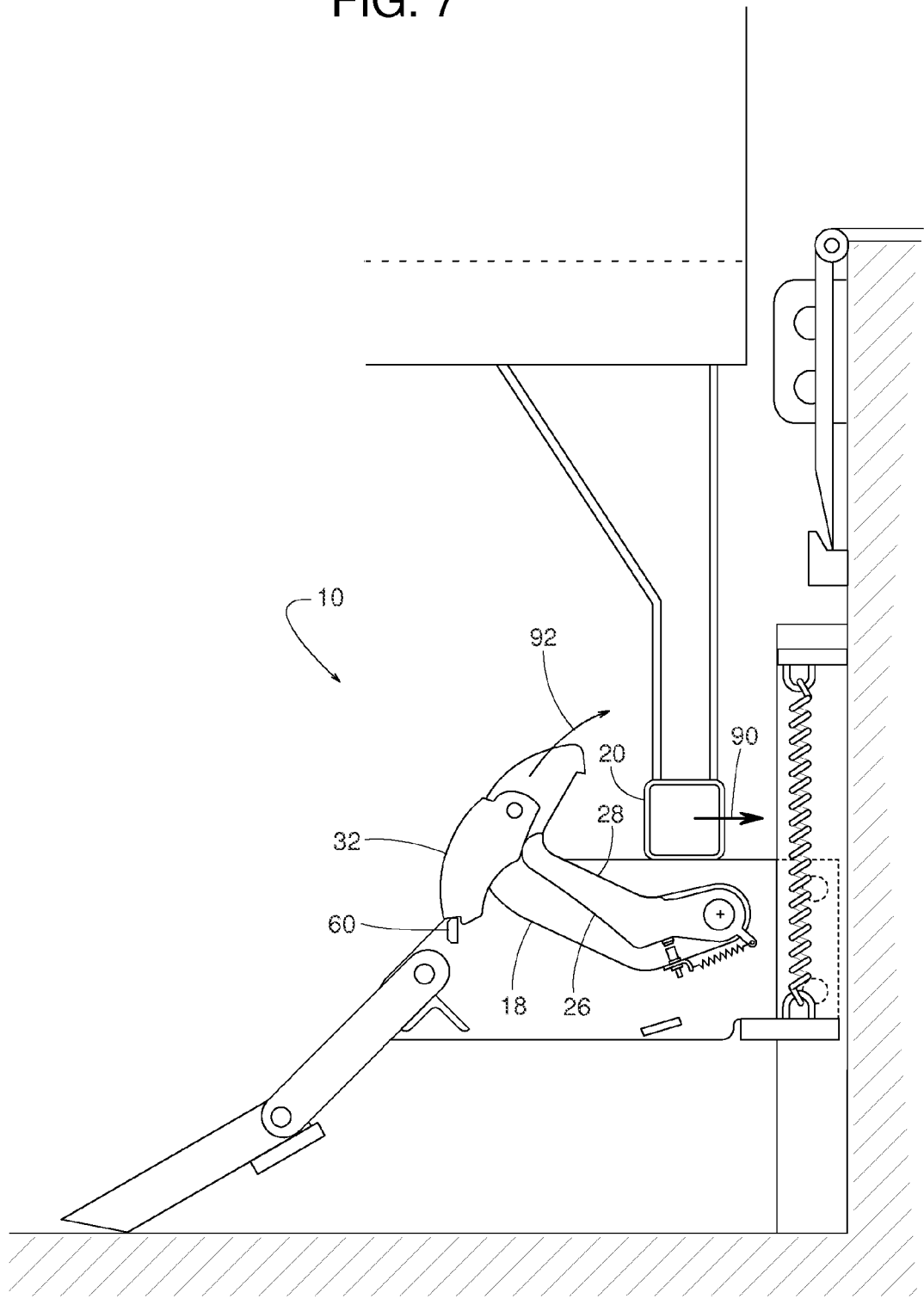
FIG. 7 is a side view similar to FIG. 5 but with arrows showing movement of the RIG and the example barrier.
Figure 8:
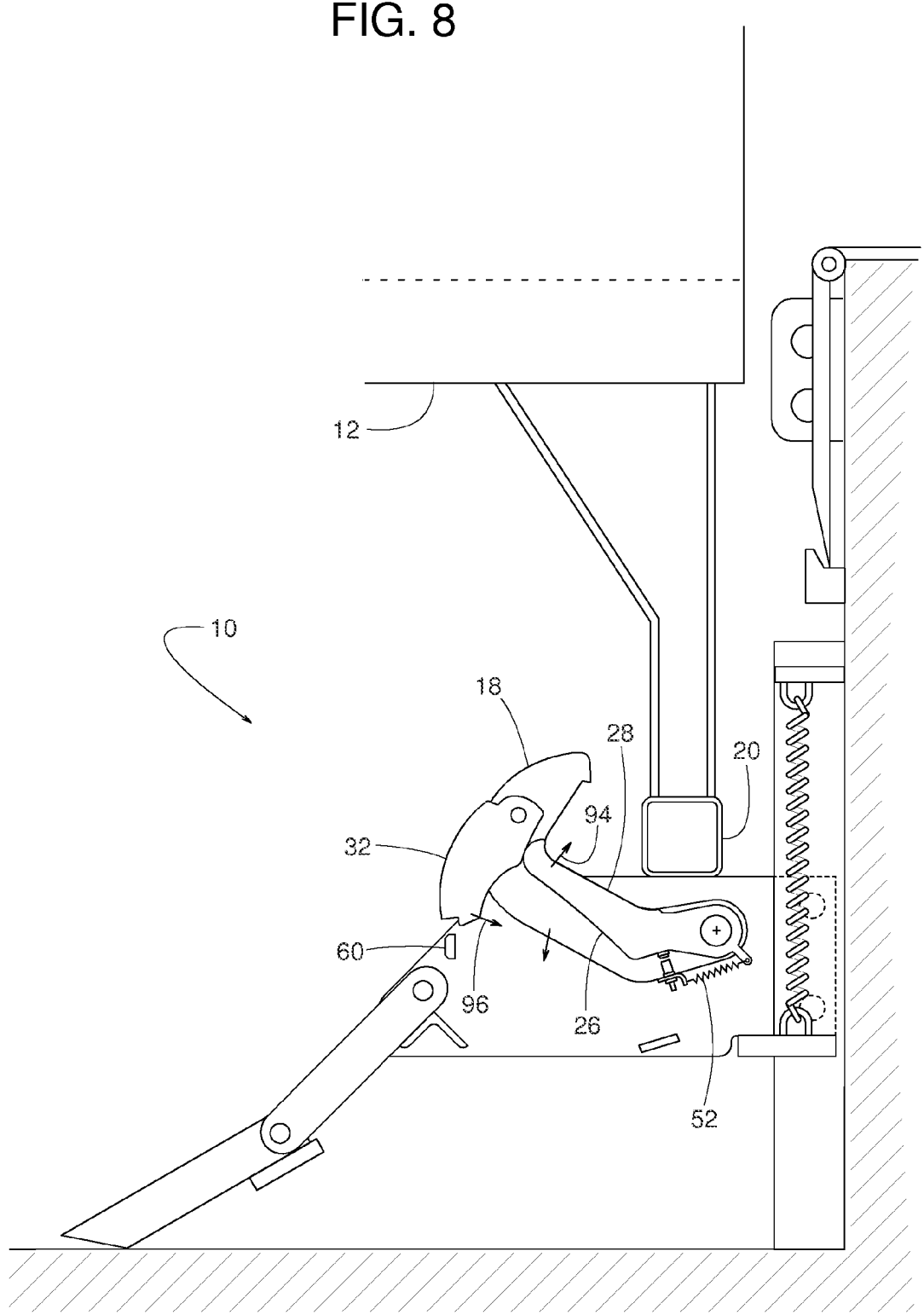
FIG. 8 is a side view similar to FIG. 7 but with arrows showing movement of the example pawl, the example pawl actuator and the example barrier.

To release the vehicle 12 from the condition shown in FIG. 5, in some examples, the vehicle 12 first moves the RIG 20 backwards, as indicated by an arrow 90 in FIG. 7, and then the drive motor 30 (e.g., momentarily, for example, 1-5 seconds) raises the barrier 18 (e.g., toward the dock face 14 and/or a blocking position), as indicated by an arrow 92 of FIG. 7. This action disengages the pawl 32 from the stop 60, as shown in FIG. 8. The action also allows the spring 52 to move the pawl actuator 26 in the direction indicated by an arrow 94 of FIG. 8. As the spring 52 moves the pawl actuator 26 in direction 94 to the raised position relative to the barrier 18, the spring 66 (FIG. 6) moves the pawl 32 in direction 96 to the released position of the pawl 32. With the pawl 32 in the released position (e.g., FIGS. 1-3), the drive motor 30 is activated to rotate the barrier 18 back down to the stored position (FIGS. 1 and 2) free from interference from the pawl 32 and/or the pawl actuator 26.

In some cases, a vehicle's RIG-supporting structure includes some sort of obstruction that prevents the barrier 18 from extending over the top of the RIG 20. Examples of such obstructions include a vertical plate 36 or an inclined plate 40, as shown for example in FIGS. 9 and 10, respectively. Although the RIG 20' or 20" in such cases might not cause to the pawl actuator 26 to move completely to the lowered position (e.g., when the contact surface 28 is not flush with the throat surface 74 as shown in the illustrated examples of FIG. 9 or 10), and the sensor 84 senses that the RIG 20' or 20" is not against or in contact with the throat surface 74, the pawl actuator 26 is still able to move the pawl 32 to the activated position where the pawl 32 engages the stop 60, thereby enabling the barrier 18 to provide a substantial obstruction to forward movement of the RIG 20' or 20" in a direction away from the dock face 14.

In some examples, the sensor 84 is connected in communication with a visual or audible signal generator 98. For example, a feedback signal 100 is conveyed from the sensor 84 directly to the signal generator 98 or indirectly through a controller to indicate one or more operating conditions of the vehicle restraint 10. Example implementations of the signal generator 98 include, but are not limited to, a red/green light system, a red/yellow/green light system, red/green light system where one of the lights can flash to indicate a fault or some other warning, an audible system, etc. In some examples, the signal generator 98 provides one set of signals to a driver of the vehicle 12 and a different set of signals to dockworkers behind the vehicle 12. In some examples, the signal generator 98 is responsive to the sensor 84 plus input or feedback from other sensors and/or switches.

In some examples, the signal generator 98 provides a first signal 102 (e.g., a red light to the driver) when the sensor 84 senses that the pawl actuator 26 is in the lowered position, whereby the first signal 102 provides an indication representative of the RIG 20 being properly restrained by the barrier 18, for example, as shown in FIG. 4. In some examples, the signal generator 98 provides a second signal 104 (e.g., a green light to the driver) when the sensor 84 senses that the pawl actuator 26 is at the raised position when the drive motor 30 has moved the barrier 18 to the stored position, as shown in FIGS. 1 and 2. In some examples, the signal generator 98 provides a third signal 106 (e.g., flashing red light to the driver) when the sensor 84 senses that the pawl actuator's contact surface 28 is not flush with the throat surface 74 of the barrier 18 when the barrier 18 is at the intermediate position, for example, as shown in FIGS. 9 and 10. In some examples, the first signal 102 can be interpreted as indicating a condition where the RIG 20 is more securely restrained than when third signal 106 is present.

In some examples, in addition or as an alternative to the sensor 84, another sensor (e.g., a proximity sensor, a limit switch, a photoelectric eye, a rotational switch, a resolver, an encoder, etc.) identifies when the barrier 18 relative to the main body 44 has rotated a certain degree or otherwise moved a certain amount to place the barrier 18 at or above the intermediate position of the barrier 18 (e.g., the position shown in FIG. 5, 6, 7, 9 or 10).

Figure 13:
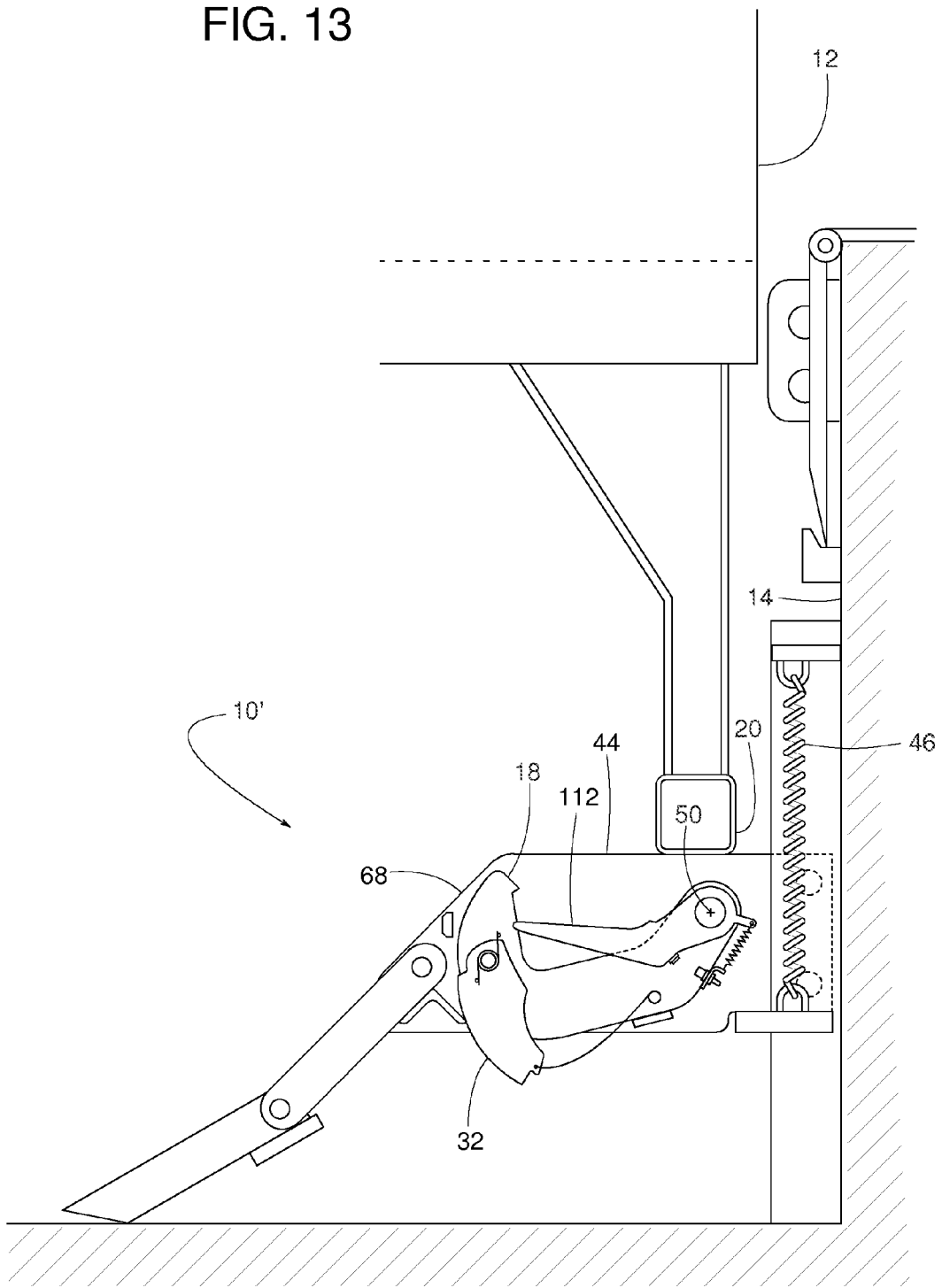
FIG. 13 is a side view of the example vehicle restraint of FIG. 11 but showing a barrier of the example restraint blocking a RIG of the vehicle.
Figure 14:
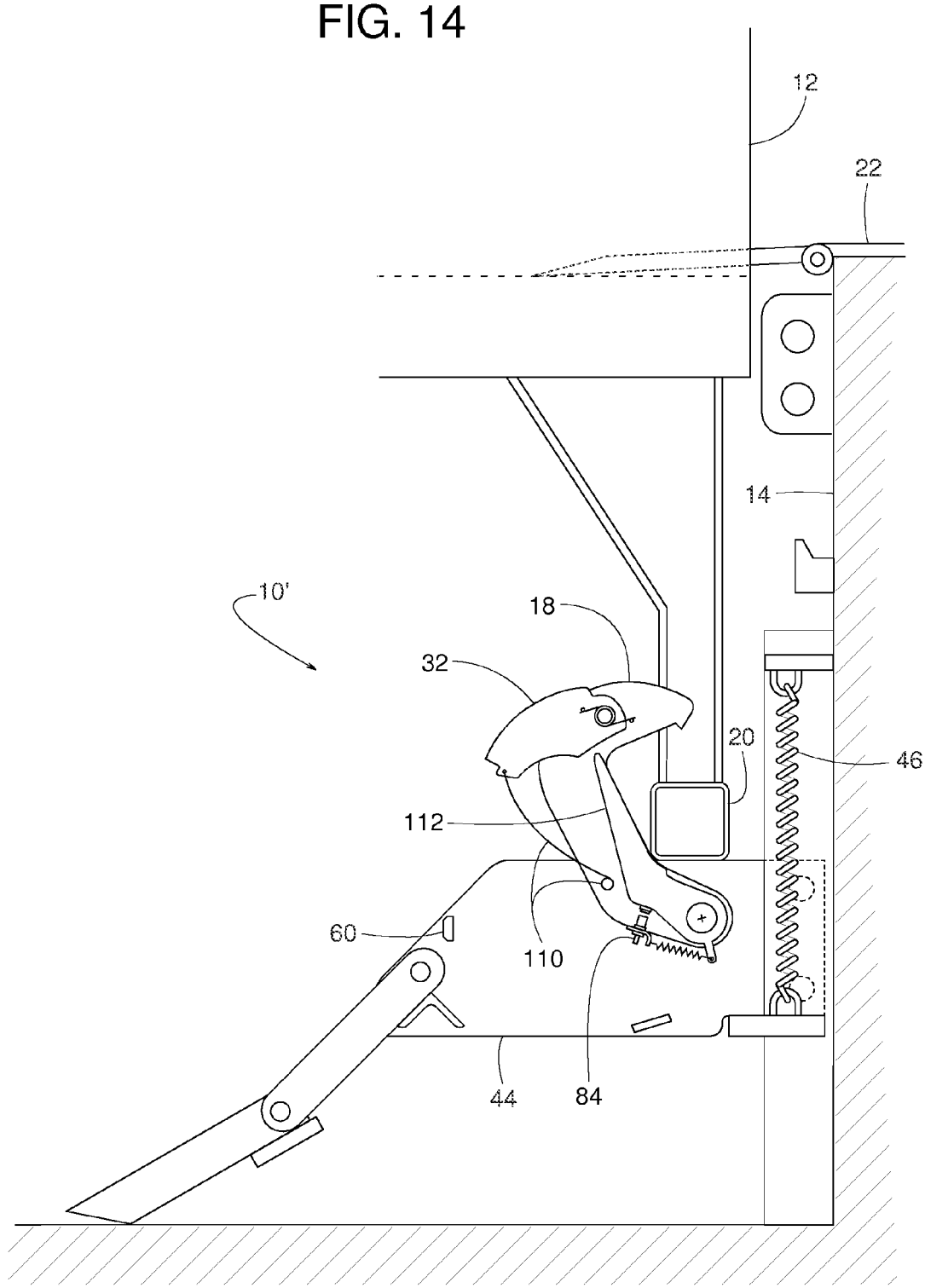
FIG. 14 is a side view of the example vehicle restraint of FIG. 11 but showing a pawl actuator of the example restraint at a lowered position relative to the barrier.
Figure 15:
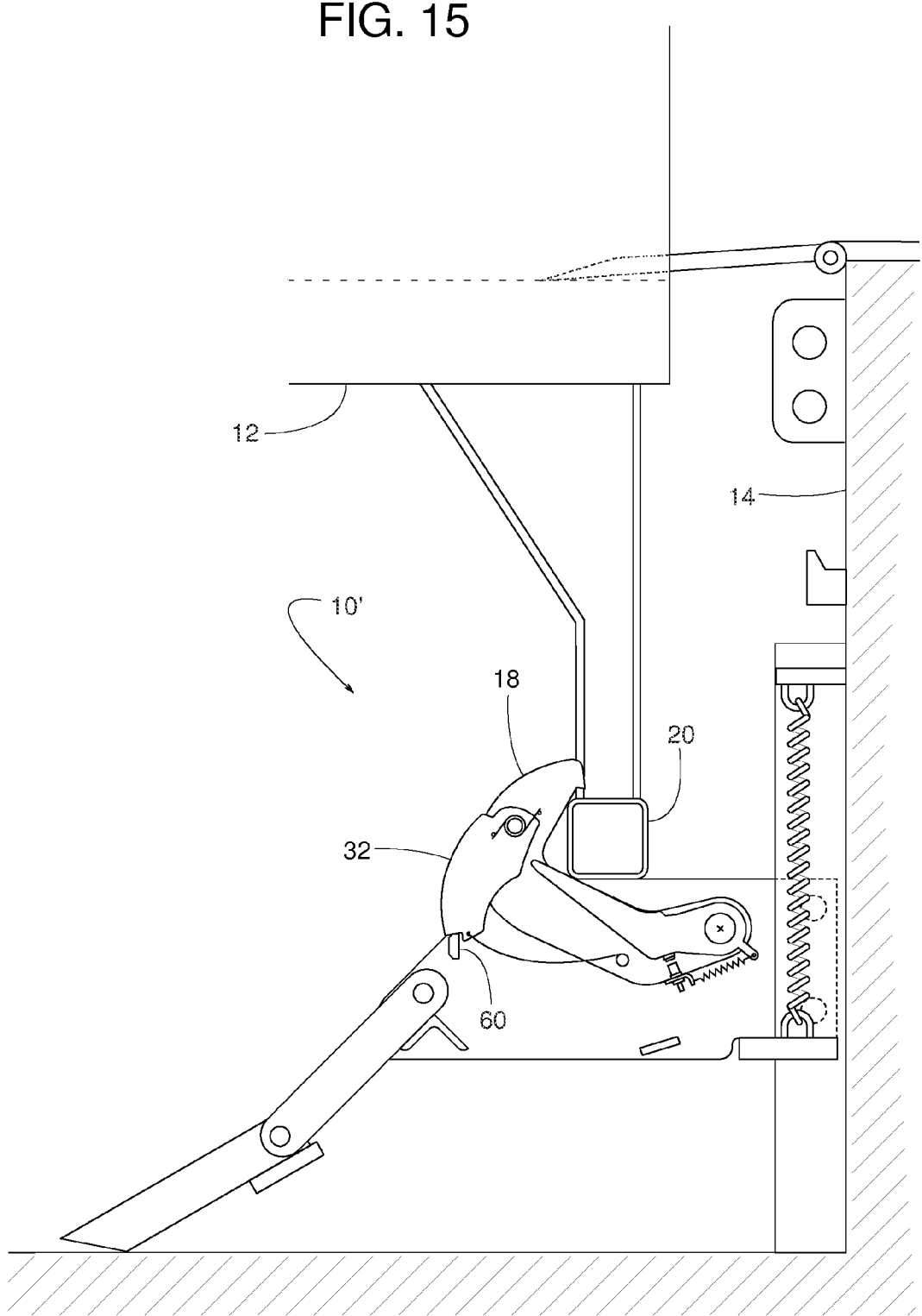
FIG. 15 is a side view of the example vehicle restraint of FIG. 11 but showing the RIG having moved the barrier of the example restraint to an intermediate position with a pawl of the example restraint engaging a stop.
Figure 16:
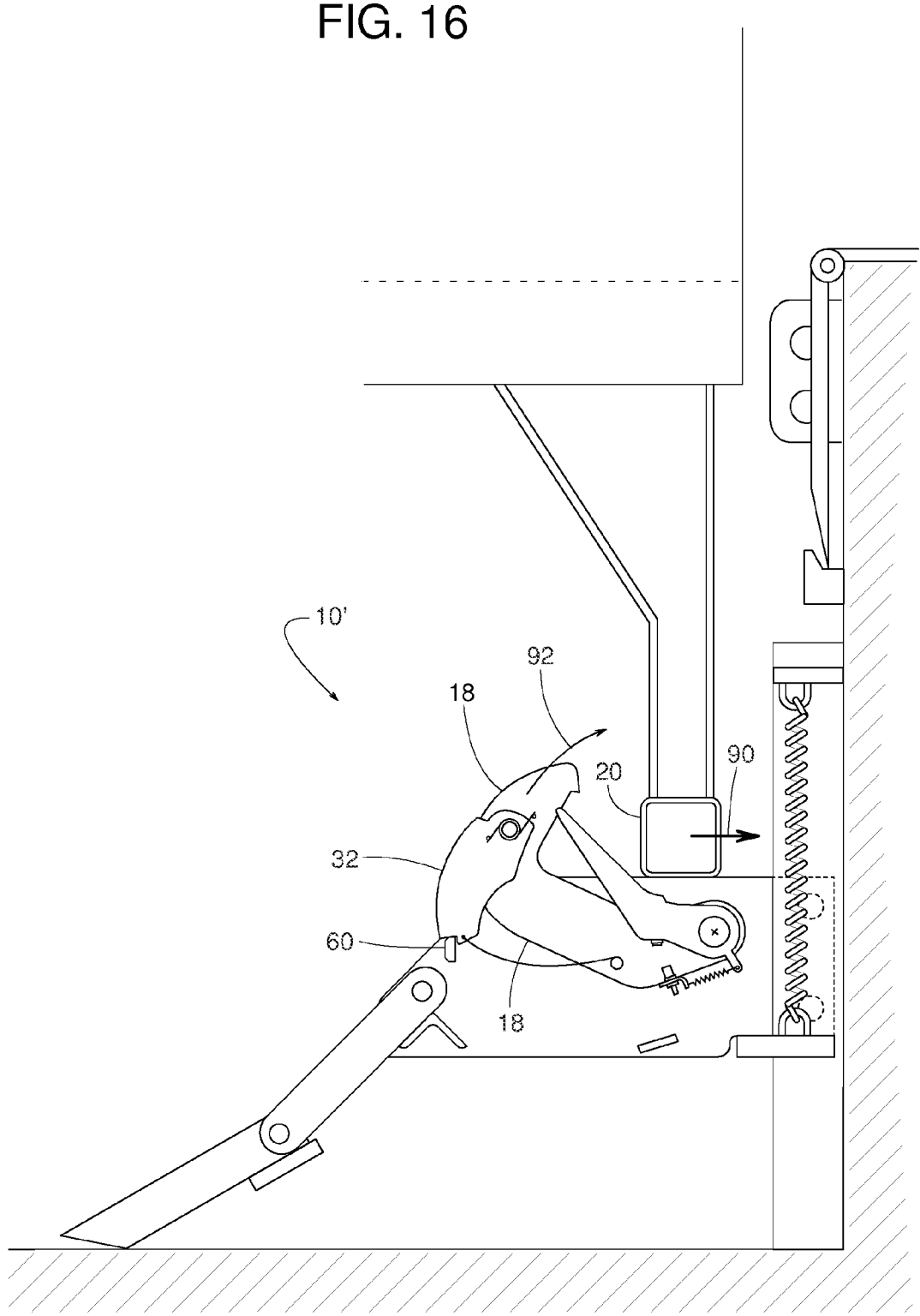
FIG. 16 is a side view of the example vehicle restraint of FIG. 11 but with arrows showing movement of the RIG and the example barrier.
Figure 17:
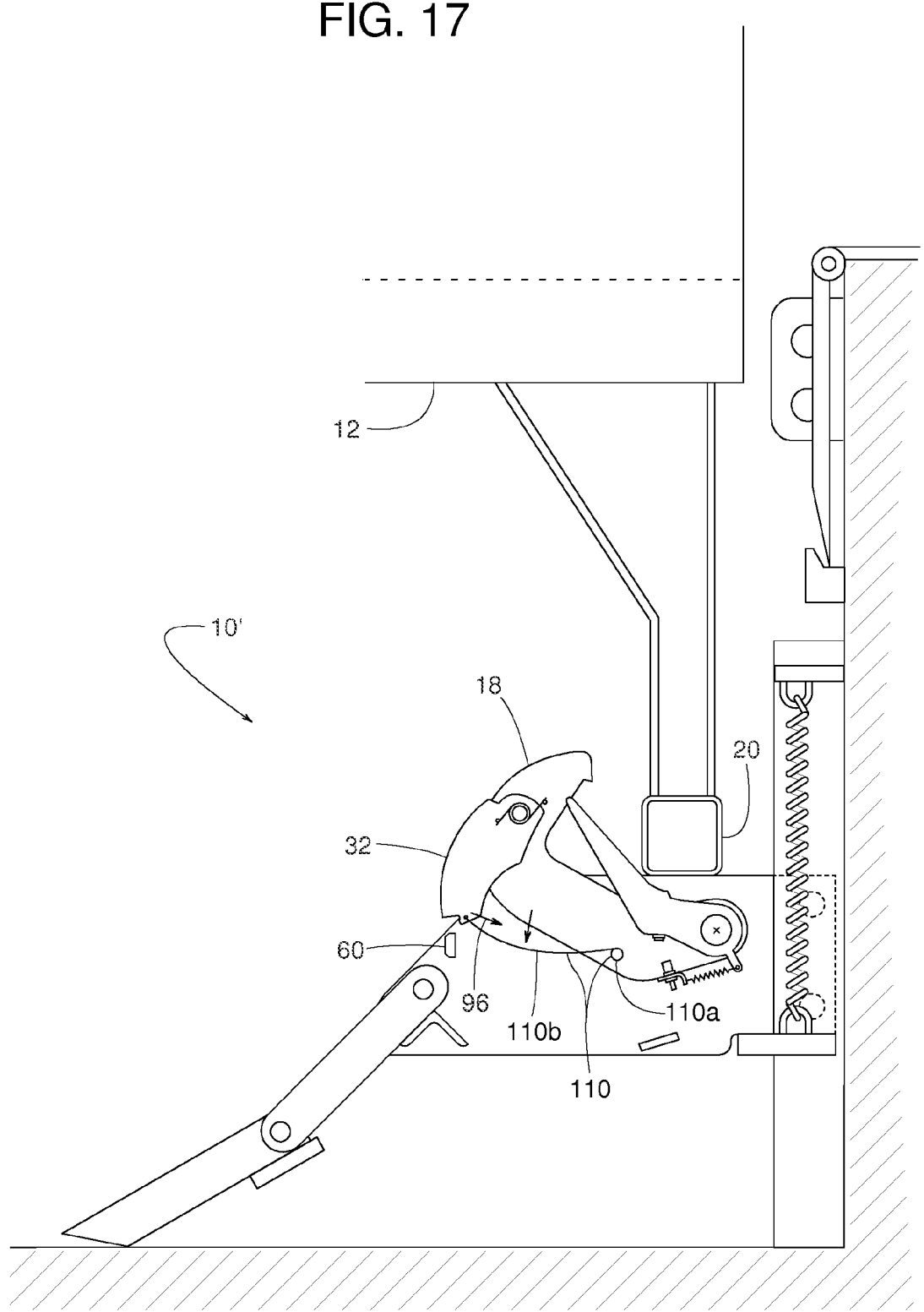
FIG. 17 is a side view FIG. 11 but with arrows showing movement of the example pawl, the example pawl actuator and the example barrier.

In another example, shown in FIGS. 11-18, a vehicle restraint 10' includes a biasing member 108 that urges the pawl 32 to the activated position (FIGS. 11-17). In some such examples, the pawl 32 naturally engages the stop 60 when the barrier 18 descends to the intermediate blocking position (FIGS. 15 and 16). In some examples, the biasing member 108 is a torsion spring disposed around the pin 58 so as to urge or bias the pawl 32 to rotate around the pin 58 in a first direction (e.g., a clockwise direction as viewed in the drawing figures).

Figure 18:
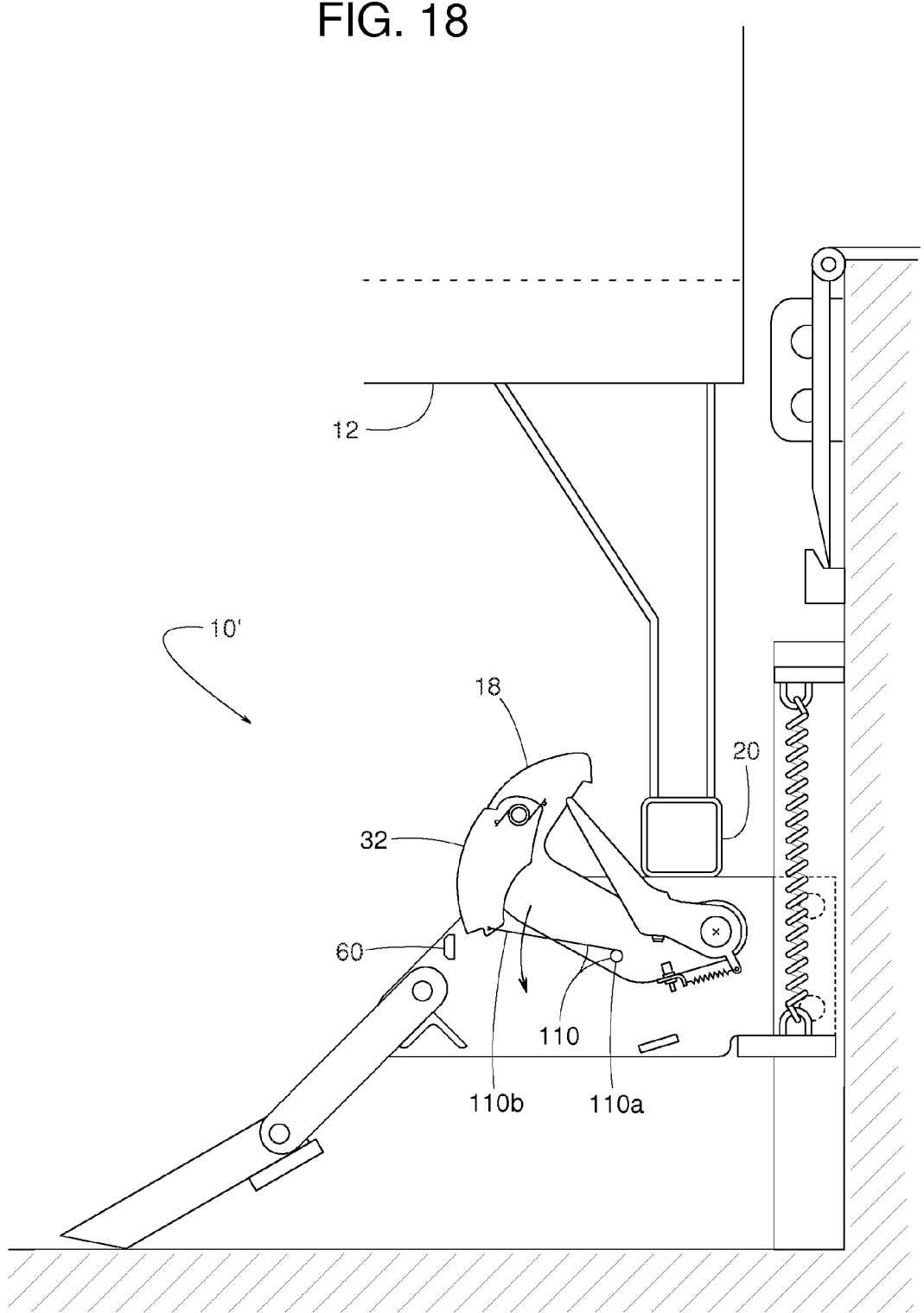
FIG. 18 is a side view similar to FIG. 17 but showing a pawl actuator of the example vehicle restraint of FIG. 11 in an override position.

To allow the barrier 18 to descend from the first blocking position (e.g., FIGS. 14 and 17) down to the stored position (e.g., FIGS. 11-13), a pawl actuator 110 moves the pawl 32 from the activated position (FIGS. 11-17) to the released position (FIG. 18) so the pawl 32 clears the stop 60 as the barrier 18 descends. In the example illustrated in FIGS. 11-18, the pawl actuator 110 includes a motor driven take-up spool 110a about which a flexible elongate member 110b is wrapped or wound. The spool 110a of the illustrated example is coupled to the main body 44 and is rotatable relative thereto to move the pawl actuator 32 between a freed position (FIGS. 11-17) and an override position (FIG. 18). In the illustrated example, the spool 110a is selectively rotatable in either a first direction or a second direction (e.g., a clockwise or counter-clockwise direction). In the first direction, the spool 110a pays out the elongate member 110b to create slack that allows the biasing member 108 to move the pawl 32 to the activated position. In the second direction, the spool 110a draws in the elongate member 110b to pull the pawl 32 to the released position. The term, "flexible," describes any member that is of a material, size and shape that can visibly deflect an appreciable amount under its own weight. Example implementations of the flexible elongate member 110b include, but are not limited to, a cable, chain, strap, wire, rope, etc.

Figure 11:
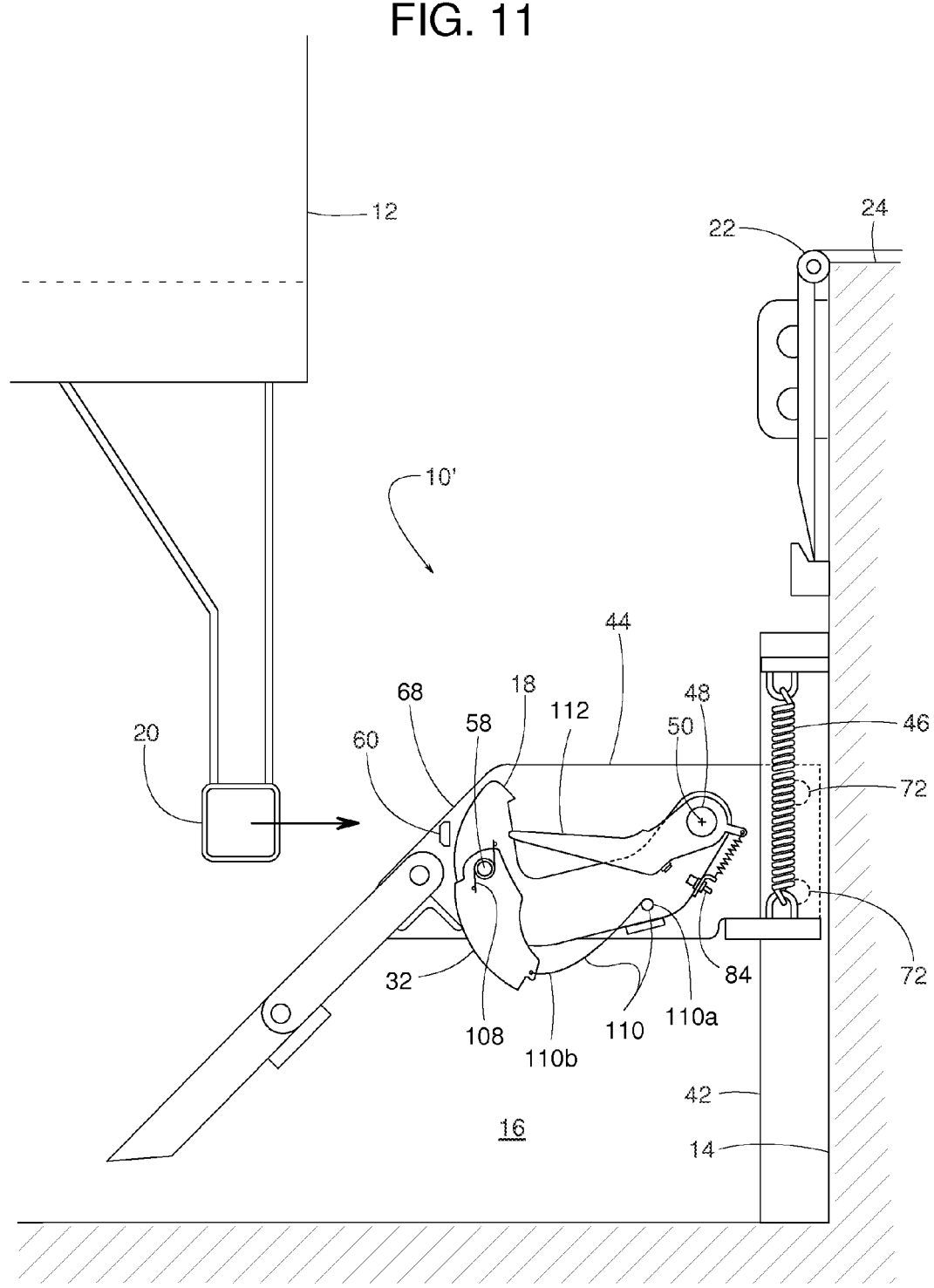
FIG. 11 is a side view of another example vehicle restraint constructed in accordance with the teachings disclosed herein.

Some example operations of the vehicle restraint 10' follow the sequence of FIGS. 11-18. FIG. 11 shows the vehicle 12 backing into dock 16, approaching the vehicle restraint 10'. At this point in the operation, the spring 46 holds the main body 44 at a raised preparatory position to receive the RIG 20. To allow the vehicle 12 to move the RIG 20 back over the top of the barrier 18, the drive motor 30 (FIG. 6) retracts the barrier 18 to the stored position relative to the main body 44. The pawl actuator 110 is in the freed position, so the biasing member 108 rotates the pawl 32 to the activated position relative to the barrier 18.

Figure 12:
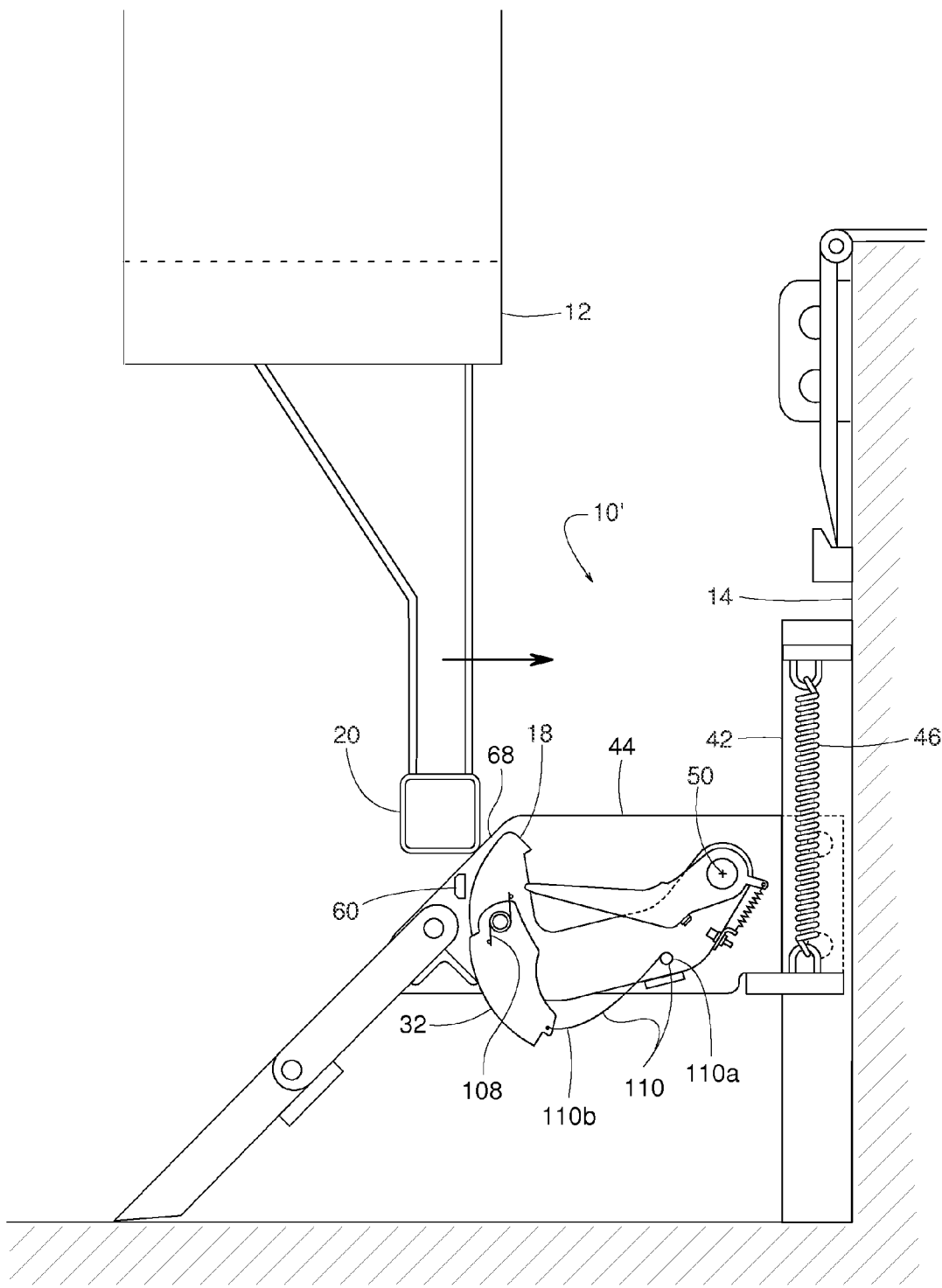
FIG. 12 is a side view of the example vehicle restraint of FIG. 11 but showing a vehicle pushing a main body of the example restraint downward.

Next, FIG. 12 shows the vehicle 12 continuing to move back toward the dock face 14. Upon doing so, the RIG 20 forces the main body 44 downward as the RIG 20 slides along the ramp portion 68 of the main body 44. As the RIG 20 pushes the main body 44 down, as shown in illustrated example of FIG. 12, the barrier 18 remains in the stored position, and the biasing member 108 holds the pawl 32 at the activated position because the pawl actuator 110 is in the freed position.

After the RIG 20 pushes the main body 44 down to an operative position (FIG. 13), and the vehicle 12 moves the RIG 20 sufficiently close to the dock face 14, the drive motor 30 is activated to lift the barrier 18 to the first blocking position shown in FIG. 14. In some examples, a sensing arm 112 operatively connected or coupled to the sensor 84 and pivotally connected or coupled to barrier 18 determines, in a manner similar to the pawl actuator 26, whether the RIG 20 is fully captured within or by the barrier 18. In some examples, when the vehicle 12 pushes the barrier 18 from the position of FIG. 14 to that of FIG. 15, the pawl 32 being in the activated position engages the stop 60 to prevent the barrier 18 from descending lower than an intermediate blocking position such as shown, for example, in FIG. 15.

To release the vehicle 12 from the condition shown in FIG. 15, in some examples, the vehicle 12 first moves the RIG 20 backwards, as indicated by arrow 90 in FIG. 16, and then the drive motor 30 (FIG. 6) (e.g., momentarily) raises the barrier 18 in a direction toward the dock face 14 indicated by arrow 92 of FIG. 16. This action causes the pawl 32 from disengaging the stop 60 as shown, for example, in FIG. 17. Once the pawl 32 disengages the stop 60, the motorized spool 110a draws in the elongate member 110b to pull the pawl 32 from the activated position (FIG. 17) to the released position (FIG. 18) as indicated by arrow 96 of FIG. 17. With the pawl 32 in the released position, the drive motor 30 (FIG. 6) is activated to rotate the barrier 18 freely back down to the stored position (FIGS. 11-13).

Figure 19:
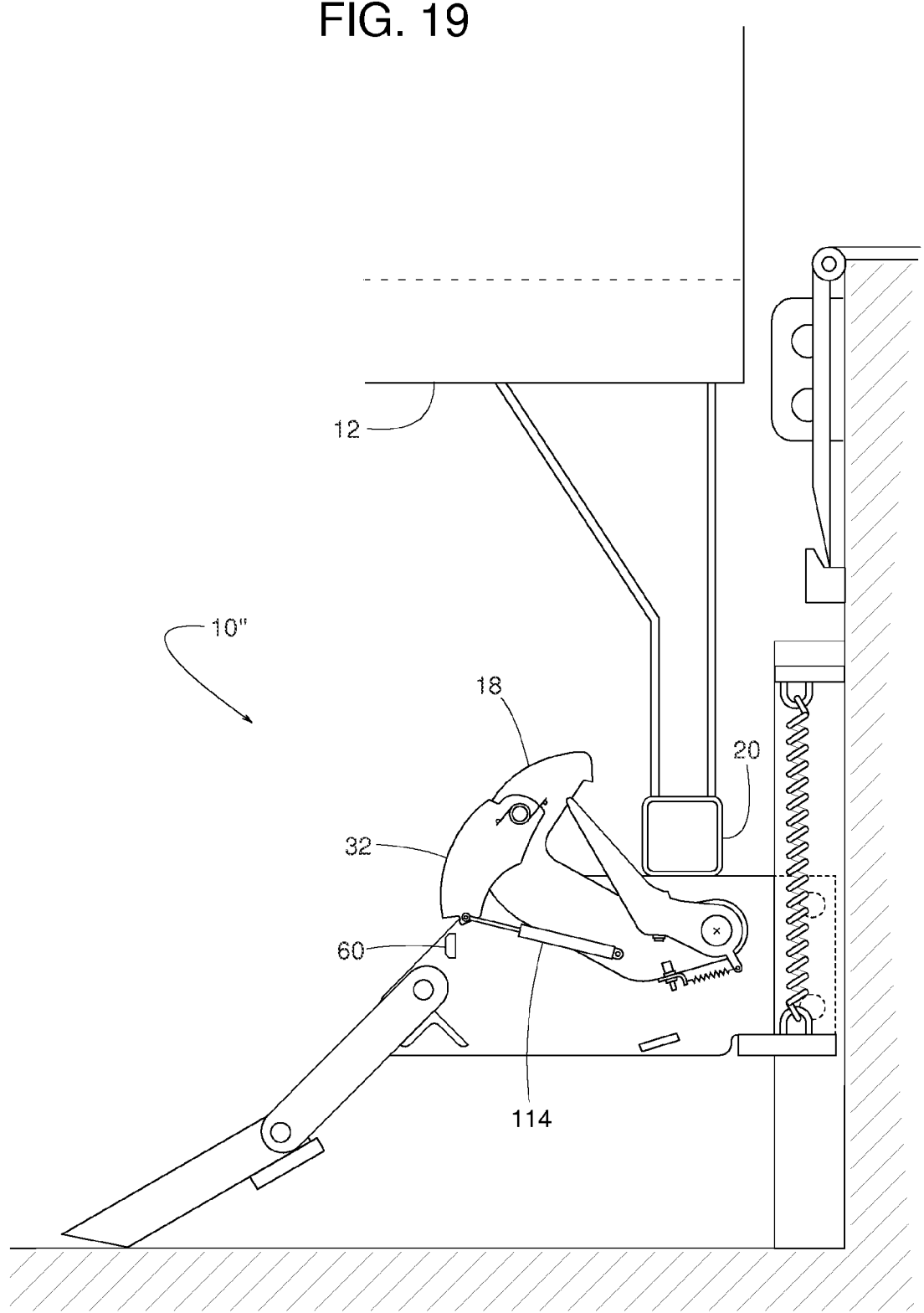
FIG. 19 is a side view of another example vehicle restraint constructed in accordance with the teachings of this disclosure.
Figure 20:
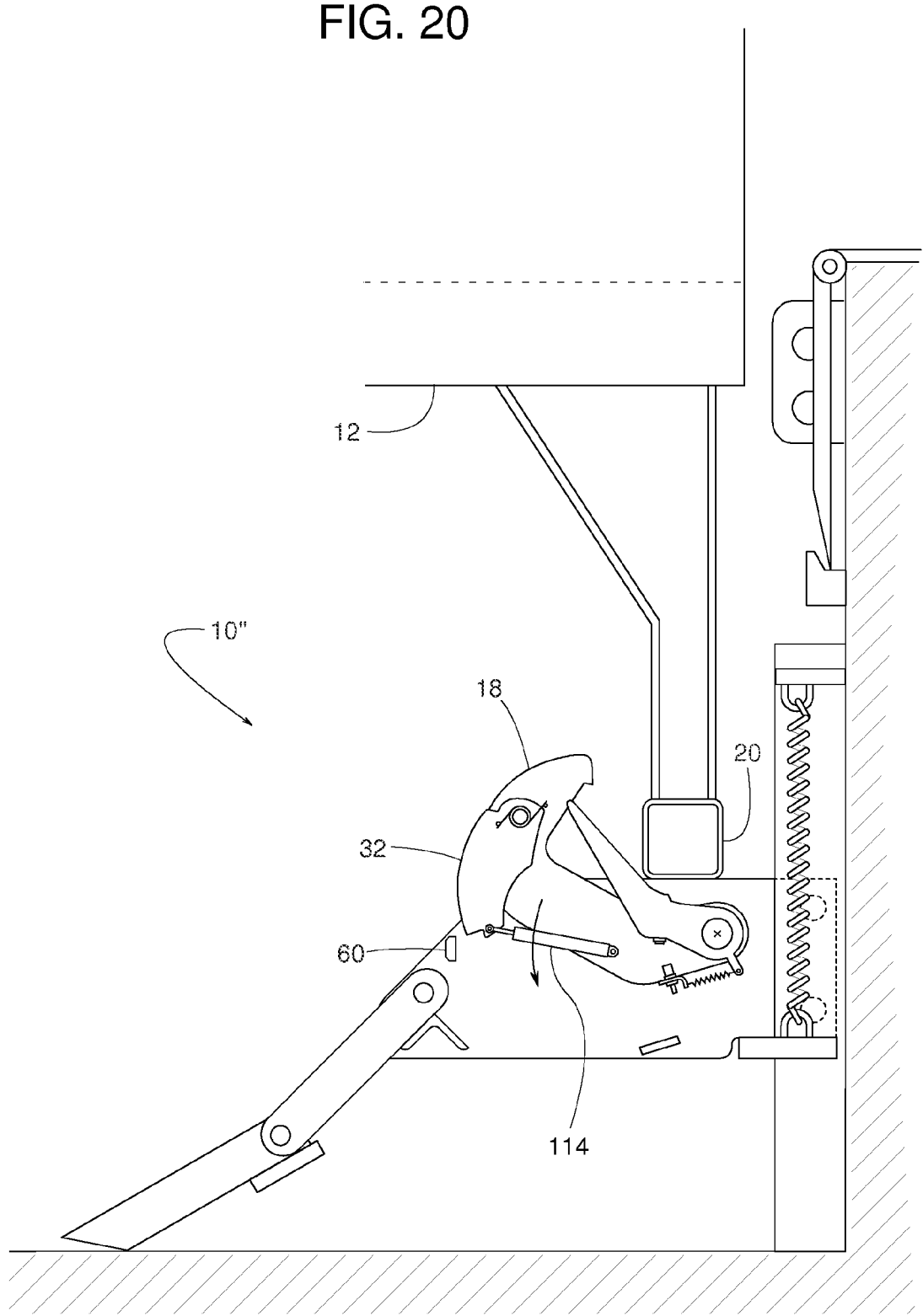
FIG. 20 is a side view of the example vehicle restraint of FIG. 19 but showing but showing a pawl actuator of the example vehicle restraint of FIG. 19 in an override position.

FIGS. 19 and 20 show an example vehicle restraint 10" with another example pawl actuator 114 disclosed herein. In the illustrated example of FIGS. 19 and 20, the pawl actuator 114 is a piston/cylinder acting between the pawl 32 and the barrier 18. Actuation examples of the pawl actuator 114 include, but are not limited to, hydraulic, pneumatic, double-acting, single-acting-spring-return, etc. In some examples, the pawl actuator 114 is a linear motor. The functions of the vehicle restraint 10" and the pawl actuator 114 are basically the same as that of the vehicle restraint 10' and the pawl actuator 110, respectively, wherein FIGS. 19 and 20 correspond to FIGS. 17 and 18, respectively.

Figure 21:
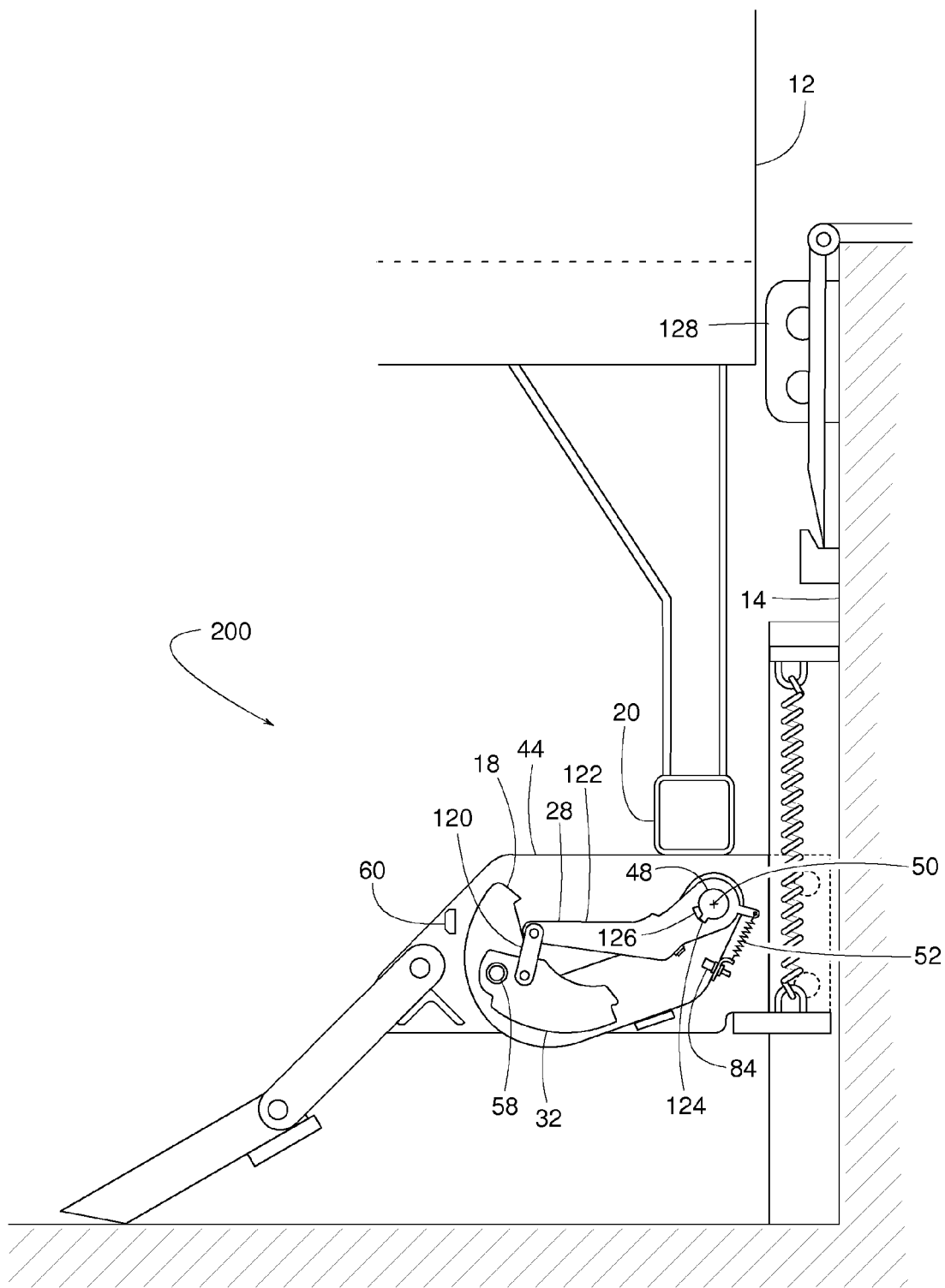
FIG. 21 is a side view of another example vehicle restraint constructed in accordance with the teachings disclosed herein, where some parts of the example vehicle restraint are omitted to show the inner workings of the restraint more clearly.

FIGS. 21-25 show an example vehicle restraint 200 that reduces the number of springs and reduces (e.g., minimizes) sliding friction. In the illustrated example, the vehicle restraint 200 includes a link 120 connecting the pawl 32 to a pivotal pawl actuator 122. With the link 120 coupling the actuator 122 to the pawl 32 as shown in the illustrated example, the actuator 122 serves two functions. The contact surface 28 of the actuator 122 senses the position of the RIG 20 relative to the barrier 18, and the actuator 122 pivots the pawl 32 between the activated position (FIGS. 24 and 25) and the released position (FIG. 21).

To enable the actuator 122 to perform these functions, the barrier 18 and the actuator 122 are attached to the shaft 48 in a mounting arrangement that permits limited relative rotation between the barrier 18 and the actuator 122. In the illustrated example, a key 124 in the shaft 48 locks the barrier 18 to the shaft 48, so the barrier 18 and the shaft 48 rotate as a unit about the axis 50. The pawl actuator 122 is also mounted to shaft 48. However, a slot 126 in the actuator 122 provides the actuator 122 with a limited range of rotation relative to the shaft 48 and the barrier 18.

Figure 22:
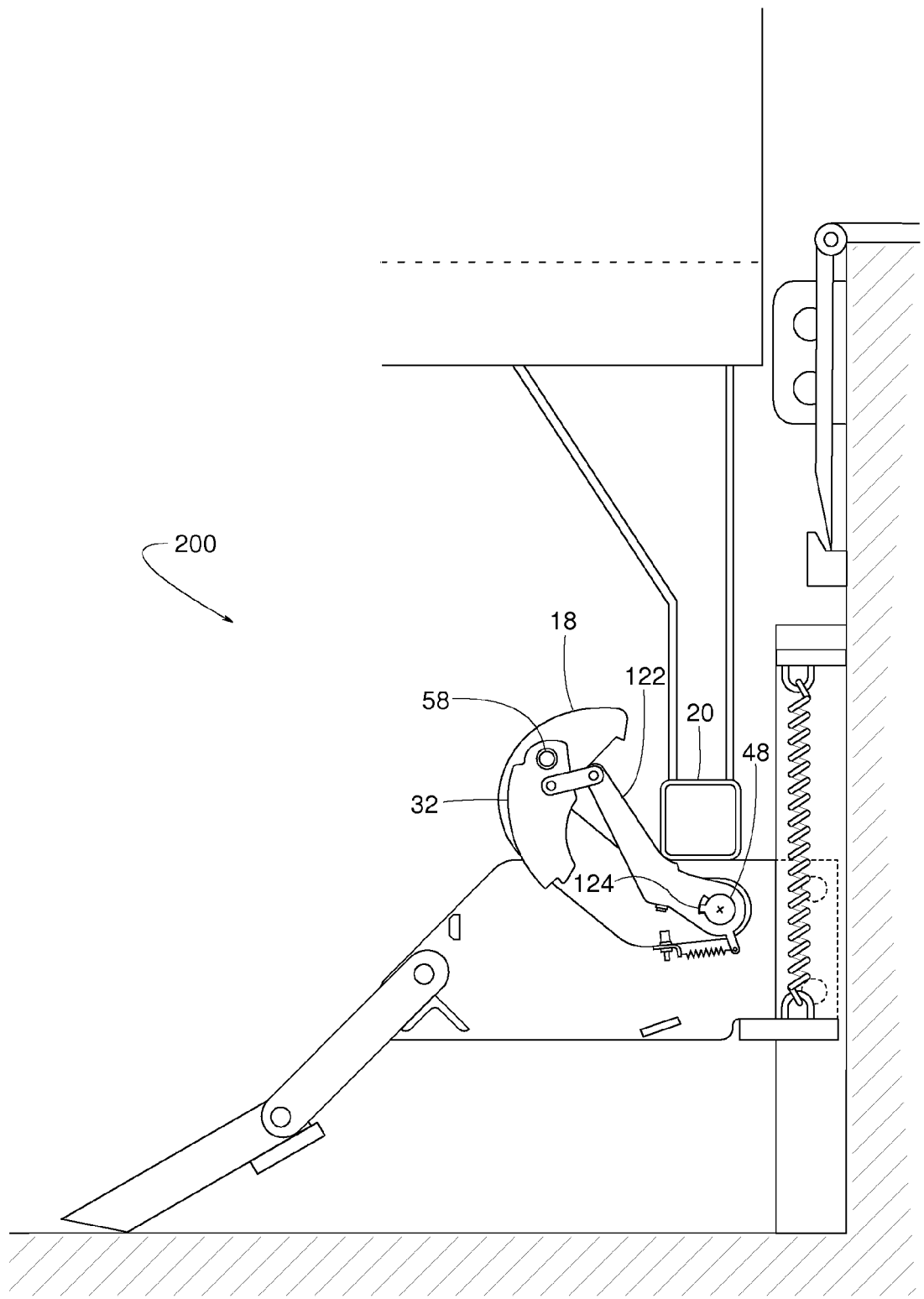
FIG. 22 is a side view of the example restraint of FIG. 21 but showing the example restraint of FIG. 21 in another configuration.

Some example operations of the vehicle restraint 200 follow the sequence presented in FIGS. 21-25. FIG. 21 shows the RIG 20 having pushed the main body 44 down to an operative position while the barrier 18 is in the stored position relative to the main body 44. FIG. 22 shows that once the RIG 20 is properly positioned back against a bumper 128, or at least proximate the bumper 128, the drive motor 30 (shown in FIG. 6) is activated to rotate the barrier 18 up to a first blocking position. From the perspective of FIGS. 21 and 22, the spring 52 urges the actuator 122 clockwise about axis 50 and, due to the link 120, also urges the pawl 32 counterclockwise about the pin 58. Upon the drive motor 30 lifting the barrier 18, the position of the RIG 20 relative to the barrier 18 determines the actual positions of the actuator 122 and the pawl 32 within the limited range allowed by the key 124 being confined within the slot 126. It should be noted that as the barrier 18 rotates clockwise about the axis 50 from the position shown in FIG. 21 to a position just prior to engaging the RIG 20, the barrier 18, the actuator 122 and the pawl 32 all rotate about the axis 50 (common axis).

Figure 23:
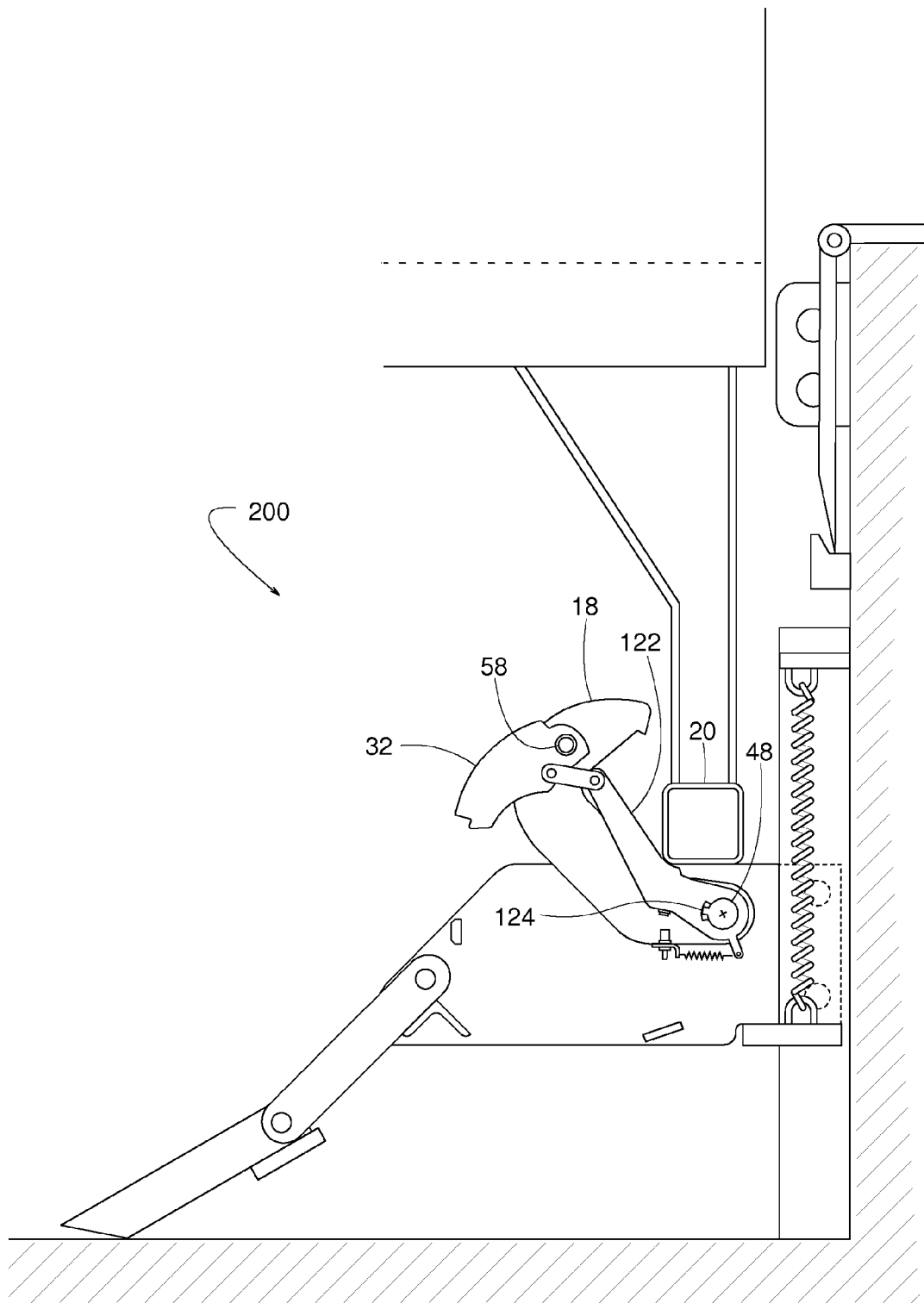
FIG. 23 is a side view of the example vehicle restraint of FIG. 21 but showing the example restraint of FIG. 21 in another configuration.

FIG. 23 shows the barrier 18 having moved closer to the RIG 20 by rotating clockwise from the position shown in FIG. 22. The barrier's movement relative to the RIG 20 rotates the actuator 122 counterclockwise relative to the barrier 18 and thus rotates the pawl 32 clockwise about the pin 58.

Figure 24:
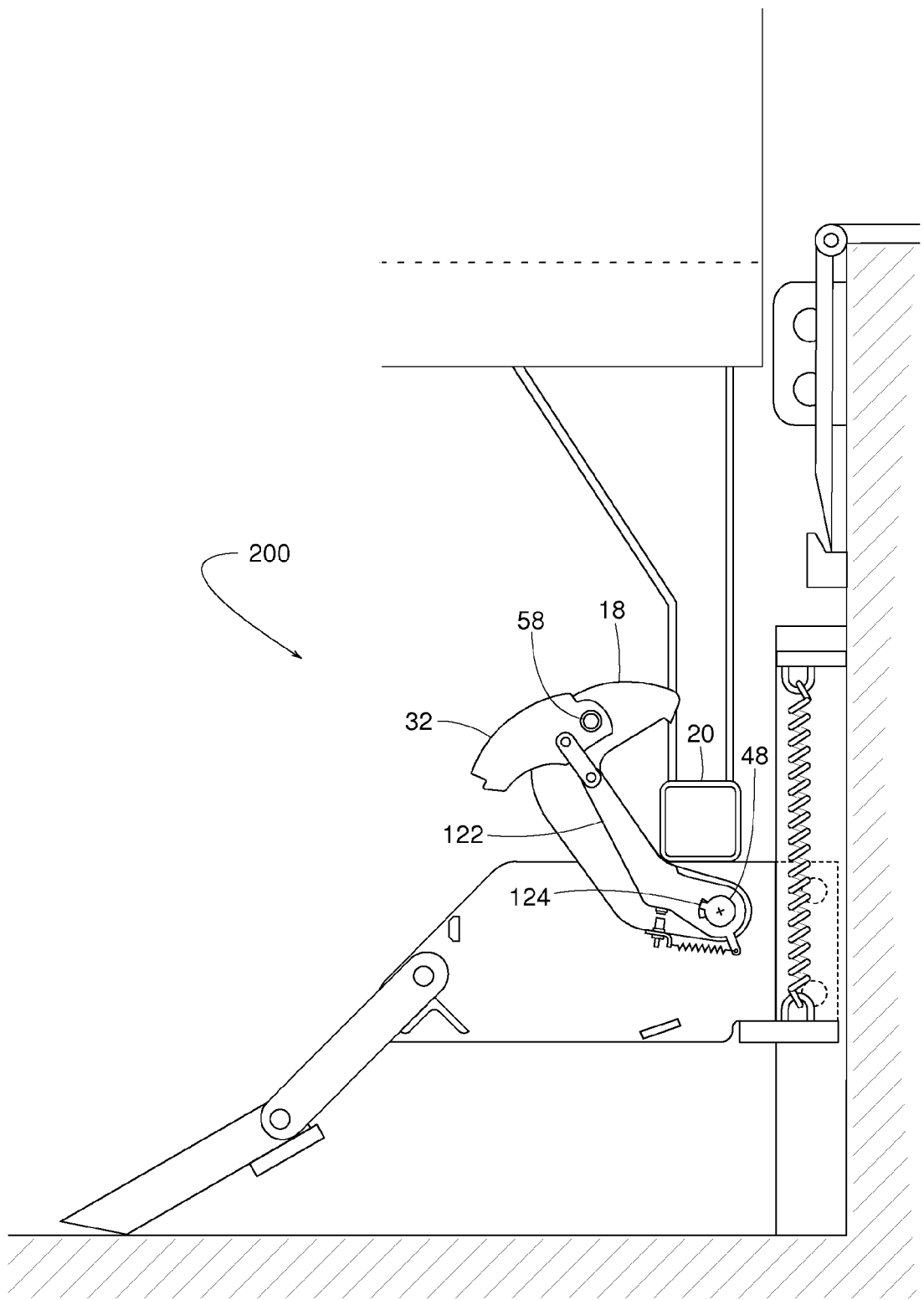
FIG. 24 is a side view of the example vehicle restraint of FIG. 21 but showing the example restraint of FIG. 21 in another configuration.

FIG. 24 shows the barrier 18 having moved even closer to the RIG 20 by rotating farther clockwise from the position shown in FIG. 23. The barrier's movement rotates the actuator 122 farther counterclockwise relative to the barrier 18 and thus rotates the pawl 32 farther clockwise about the pin 58.

Figure 25:
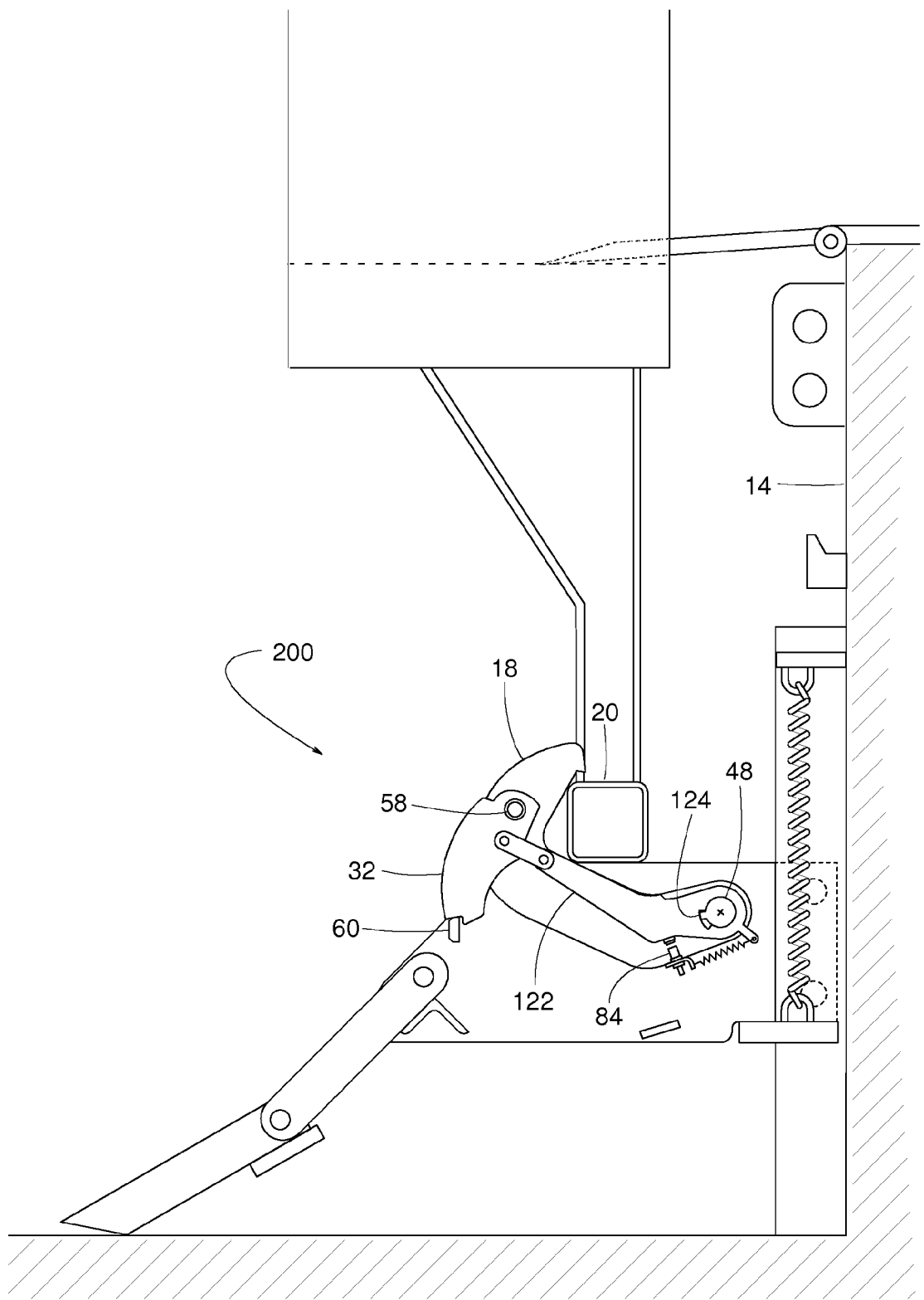
FIG. 25 is a side view of the example vehicle restraint of FIG. 21 but showing the example restraint of FIG. 21 in another configuration.

FIG. 25 shows the vehicle 12 having moved the RIG 20 forward away from the dock face 14. The RIG's forward movement rotates the barrier 18 counterclockwise until the pawl 32 engages the stop 60, at which point the barrier 18 stops at the intermediate blocking position to secure the vehicle 12. This stage of operation corresponds to the example stages shown in FIGS. 5 and 15. Subsequently returning the barrier 18 to the stored position of FIG. 21 can be accomplished by following the example operating release sequences shown and described with respect to the vehicle restraints 10 and 10'. In some examples, the sensor 84 of the vehicle restraint 200 is connected and operates in the same manner as in the examples of the vehicle restraints 10 and 10'.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

What is claimed is:

1. A vehicle restraint to engage a RIG (rear impact guard) of a vehicle at a loading dock, the vehicle restraint comprising:
    a main body mountable at the loading dock to move vertically relative to the loading dock;
    a barrier movable relative to the main body to selectively block and release the RIG of the vehicle, the barrier being selectively movable to a first blocking position to block the RIG, a stored position to release the RIG, and an intermediate position between the first blocking position and the stored position;
    a pawl movable relative to the barrier between an activated position and a released position;
    a stop carried by the main body; and
    a pawl actuator coupled to at least one of the main body and the barrier, the pawl actuator being movable relative to the pawl, the pawl actuator having a contact surface to engage the RIG, the contact surface being movable between a raised position and a lowered position relative to the barrier, the contact surface to move between the raised position and the lowered position in response to relative movement between the RIG and the barrier and while the contact surface is in engagement with the RIG, movement of the contact surface from the raised position to the lowered position to cause the pawl to move from the released position to the activated position, the pawl being spaced apart from the stop when the barrier is at the intermediate position and while the pawl is in the released position, the pawl to engage the stop when the barrier is at the intermediate position and while the pawl is in the activated position.

2. A vehicle restraint to engage a RIG (rear impact guard) of a vehicle at a loading dock, the vehicle restraint comprising:
    a main body mountable at the loading dock to move vertically relative to the loading dock;
    a barrier movable relative to the main body to selectively block and release the RIG of the vehicle, the barrier being selectively movable to a first blocking position to block the RIG, a stored position to release the RIG, and an intermediate position between the first blocking position and the stored position;
    a pawl movable relative to the barrier between an activated position and a released position;
    a stop carried by the main body; and
    a pawl actuator coupled to at least one of the main body and the barrier, the pawl actuator having a contact surface to engage the RIG, the contact surface being movable between a raised position and a lowered position relative to the barrier, the contact surface of the pawl actuator to rotate relative to the barrier between the raised position and the lowered position in response to relative movement between the RIG and the barrier while the contact surface is in engagement with the RIG, movement of the contact surface from the raised position to the lowered position to cause the pawl to rotate relative to the barrier between the released position and the activated position, and as the pawl and the contact surface rotate, respectively, to the activated position and the lowered position the pawl and the contact surface rotate in opposite rotational directions, the pawl being spaced apart from the stop when the barrier is at the intermediate position and while the pawl is at the released position, the pawl to engage the stop when the barrier is at the intermediate position and while the pawl is at the activated position.

3. The vehicle restraint of claim 1, wherein the pawl and the pawl actuator are each rotatable about an axis defined by the barrier.

4. The vehicle restraint of claim 1, wherein the pawl actuator includes an upper end to rotate downward relative to the main body in response to the contact surface moving to the lowered position.

5. The vehicle restraint of claim 4, wherein the upper end of the pawl actuator is biased upward when the contact surface is disengaged from the RIG.

6. A vehicle restraint to engage a RIG (rear impact guard) of a vehicle at a loading dock, the vehicle restraint comprising:
    a main body mountable at the loading dock to move vertically relative to the loading dock;
    a barrier movable relative to the main body to selectively block and release the RIG of the vehicle, the barrier being selectively movable to a first blocking position to block the RIG, a stored position to release the RIG, and an intermediate position between the first blocking position and the stored position;
    a pawl movable relative to the barrier between an activated position and a released position;
    a stop carried by the main body; and
    a pawl actuator coupled to at least one of the main body and the barrier, the pawl actuator having a contact surface to engage the RIG, the contact surface to move between a raised position and a lowered position relative to the barrier, the contact surface to move between the raised position and the lowered position in response to relative movement between the RIG and the barrier and while the contact surface is in engagement with the RIG, movement of the contact surface from the raised position to the lowered position to cause the pawl to move from the released position to the activated position, the pawl being spaced apart from the stop when the barrier is at the intermediate position and while the pawl is at the released position, the pawl to engage the stop when the barrier is at the intermediate position and while the pawl is at the activated position;
    a sensor operatively coupled to at least one of the barrier, the pawl, or the pawl actuator, and
    a signal generator in communication with the sensor, the signal generator to provide a first signal when the barrier is in the blocking position, the signal generator to provide a second signal when the barrier is in the intermediate position, and the signal generator to provide a third signal when the barrier is in the stored position, the first signal, the second signal, and the third signal being distinguishable from each other.

7. The vehicle restraint of claim 1, further comprising:
a sensor to detect relative positioning between the barrier and the pawl actuator; and
a signal generator in communication with the sensor, the signal generator to provide a signal in response to the sensor detecting a predetermined position of the pawl actuator relative to the barrier.

8. The vehicle restraint of claim 1, further comprising a pivotal link to couple the pawl to the pawl actuator.

9. A method to selectively block and release a vehicle at a loading dock, the method comprising:
moving a main body of a vehicle restraint downward relative to the loading dock;
raising a barrier of the vehicle restraint coupled to the main body from a stored position to a first blocking position relative to the main body to block a guard of the vehicle at the loading dock;
moving a pawl actuator of the vehicle restraint relative to a pawl in response to the guard engaging a contact surface of the pawl actuator such that engagement between the guard and the contact surface forces the contact surface in a downwardly direction;
moving the pawl relative to the barrier from a released position to an activated position in response to forcing the contact surface in the downward direction, the pawl being spaced apart from a stop on the main body when the pawl is in the released position;
maintaining a spaced-apart relationship between the pawl and the stop when the barrier is in the first blocking position and while the pawl is in the activated position;
moving the barrier to an intermediate position that is above the stored position and below the first blocking position;
establishing engagement between the pawl and the stop when the barrier is in the intermediate position and while the pawl is in the activated position;
releasing the vehicle by raising the barrier from the intermediate position and away from the stored position; and
lowering the barrier to the stored position.

10. The method of claim 9, further comprising linking the pawl to the pawl actuator.

11. The method of claim 9, further comprising rotating the pawl and the pawl actuator simultaneously in opposite directions.

12. A method to selectively block and release a vehicle at a loading dock, the method comprising:
moving a main body of a vehicle restraint in a downwardly direction relative to the loading dock;
rotating a pawl actuator and a barrier of the vehicle restraint about an axis, the barrier of the vehicle restraint to move from a stored position to a first blocking position relative to the main body to block a guard of the vehicle at the loading dock;
moving the pawl actuator of the vehicle restraint in response to the guard engaging a contact surface of the pawl actuator such that engagement between the guard and the contact surface forces the contact surface in a downwardly direction;
moving the pawl relative to the barrier from a released position to an activated position in response to forcing the contact surface in the downwardly direction, the pawl being spaced apart from a stop on the main body when the pawl is in the released position;
maintaining a spaced-apart relationship between the pawl and the stop when the barrier is in the first blocking position and while the pawl is in the activated position;
moving the barrier to an intermediate position between the stored position and the first blocking position;
establishing engagement between the pawl and the stop when the barrier is in the intermediate position and while the pawl is in the activated position;
releasing the vehicle by raising the barrier from the intermediate position and away from the stored position; and
lowering the barrier to the stored position.

13. The method of claim 9, further comprising providing a signal to indicate that the vehicle is more securely restrained when the barrier is in the first blocking position and with the pawl disengaged from the stop than when the pawl is in contact with the stop.

14. A method to selectively block and release a vehicle at a loading dock, the method comprising:
raising a barrier of the vehicle restraint from a stored position to a first blocking position relative to a main body of the vehicle restraint to block a RIG (rear impact guard) of the vehicle at the loading dock;
moving a pawl actuator via engagement of the RIG with a contact surface of the pawl actuator such that engagement between the RIG and the contact surface forces the contact surface in a downwardly direction relative to the barrier;
moving a pawl relative to the barrier and the pawl actuator from a released position to an activated position in response to forcing the contact surface in the downwardly direction, the pawl being spaced apart from a stop on the main body when the pawl is in the released position;
maintaining a spaced-apart relationship between the pawl and the stop when the barrier is in the first blocking position and while the pawl is in the activated position; and
establishing engagement between the pawl and the stop when the barrier is in an intermediate position and while the pawl is at the activated position, the intermediate position being between the stored position and the first blocking position.

15. A method to selectively block and release a vehicle at a loading dock, the method comprising:
moving a barrier of the vehicle restraint from a stored position to a first blocking position relative to a main body of the vehicle restraint to block a RIG (rear impact guard) of the vehicle at the loading dock;
moving a pawl actuator via engagement of the RIG and a contact surface of the pawl actuator such that engagement between the RIG and the contact surface forces the contact surface in a downwardly direction relative to the barrier;
rotating a pawl and the pawl actuator simultaneously in opposite directions relative to the barrier, the pawl to rotate from a released position to an activated position in response to forcing the contact surface in the downwardly direction, the pawl being spaced apart from a stop on the main body when the pawl is at the released position;
maintaining a spaced-apart relationship between the pawl and the stop when the barrier is at the first blocking position and while the pawl is at the activated position; and establishing engagement between the pawl and the stop when the barrier is at an intermediate position and while the pawl is at the activated position, the intermediate position being between the stored position and the first blocking position.

16. The method of claim 14, further comprising rotating the pawl actuator and the bather about a common axis.

17. The method of claim 14, further comprising providing a signal to indicate that the vehicle is securely restrained when the barrier is in the first blocking position and with the pawl disengaged from the stop than when the pawl is in contact with the stop.

18. The method of claim 14, further comprising:
moving the RIG to push the main body downward; and
moving the RIG to push the barrier down to an intermediate position that is between the stored position and the first blocking position.

19. The method of claim 18, further comprising releasing the vehicle by raising the barrier from the intermediate position and then lowering the barrier back down to the stored position.

20. The method of claim 14, further comprising linking the pawl to the pawl actuator.

21. A vehicle restraint to engage a RIG (rear impact guard) of a vehicle at a loading dock, the vehicle restraint comprising:
a main body mountable at the loading dock to move vertically relative to the loading dock;
a barrier connected to the main body, the barrier to move relative to the main body to selectively block and release the RIG of the vehicle, the barrier to selectively move to a first blocking position to block the RIG, a stored position to release the RIG, and an intermediate position to block the RIG, the intermediate position being between the first blocking position and the stored position;
a pawl supported by the barrier, the pawl to move relative to the barrier between an activated position and a released position;
a biasing member to urge the pawl to the activated position;
a stop supported by the main body; and
a pawl actuator including a flexible elongate member, the pawl actuator to selectively move between a freed position and an override position such that:
a) when the barrier is in the first blocking position and the pawl actuator is in the override position, the pawl is in the released position spaced apart from the stop,
b) when the barrier is in the first blocking position and the pawl actuator is in the freed position, the biasing member is to position the pawl to the activated position,
c) when the barrier is in the intermediate position and while the pawl actuator is in the freed position, the pawl is in the activated position to engage the stop, and
d) when the barrier is in the intermediate position and while the pawl actuator is in the override position, the pawl is in the released position in opposition to the biasing member urging the pawl to the activated position.

22. The vehicle restraint of claim 21, wherein the pawl is spaced apart from the stop when the barrier is at the intermediate position and while the pawl actuator is in the override position.

23. The vehicle restraint of claim 21, wherein the pawl actuator comprises a flexible elongate member wrapped around a take-up spool.

24. A vehicle restraint to engage a RIG (rear impact guard) of a vehicle at a loading dock, the vehicle restraint comprising:
a main body mountable at the loading dock to move vertically relative to the loading dock;
a barrier to couple to the main body, the barrier to move relative to the barrier to selectively block and release the RIG of the vehicle, the barrier to selectively move to a first blocking position to block the RIG, a stored position to release the RIG, and an intermediate position to block the RIG, the intermediate position being between the first blocking position and the stored position;
a pawl supported by the barrier, the pawl to move relative to the barrier between an activated position and a released position;
a biasing member to urge the pawl to the activated position;
a stop supported by the main body; and
a pawl actuator including a solenoid, the pawl actuator to selectively move between a freed position and an override position such that:
a) when the barrier is in the first blocking position and the pawl actuator is in the override position, the pawl is in the released position spaced apart from the stop,
b) when the barrier is in the first blocking position and the pawl actuator is in the freed position, the biasing member is to position the pawl to the activated position,
c) when the barrier is in the intermediate position and while the pawl actuator is in the freed position, the pawl is in the activated position to engage the stop, and
d) when the barrier is in the intermediate position and while the pawl actuator is in the override position, the pawl is in the released position in opposition to the biasing member urging the pawl to the activated position.

25. The vehicle restraint of claim 21, wherein the pawl is pivotally connected to the barrier such that the pawl rotates between the activated position and the released position.

26. The vehicle restraint of claim 21, further comprising a pin about which the pawl rotates between the activated position and the released position, wherein the biasing member comprises a torsion spring disposed around the pin, the pin being connected to the barrier.

* * * * *